US010933376B1

(12) United States Patent
Oklejas, Jr.

(10) Patent No.: US 10,933,376 B1
(45) Date of Patent: Mar. 2, 2021

(54) METHOD AND SYSTEM FOR PERFORMING REVERSE OSMOSIS WITH INTEGRATED PUMP STORAGE

(71) Applicant: FLUID EQUIPMENT DEVELOPMENT COMPANY, LLC, Monroe, MI (US)

(72) Inventor: Eli Oklejas, Jr., Newport, MI (US)

(73) Assignee: FLUID EQUIPMENT DEVELOPMENT COMPANY, LLC, Monroe, MI (US)

( * ) Notice: Subject to any disclaimer, the term of this patent is extended or adjusted under 35 U.S.C. 154(b) by 33 days.

(21) Appl. No.: 16/801,255

(22) Filed: Feb. 26, 2020

Related U.S. Application Data

(60) Provisional application No. 62/810,407, filed on Feb. 26, 2019, provisional application No. 62/830,705, filed on Apr. 8, 2019.

(51) Int. Cl.
| | | |
|---|---|---|
| *B01D 61/06* | (2006.01) | |
| *B01D 61/02* | (2006.01) | |
| *B01D 61/04* | (2006.01) | |
| *C02F 1/44* | (2006.01) | |
| *B01D 61/08* | (2006.01) | |
| *C02F 103/08* | (2006.01) | |

(52) U.S. Cl.
CPC .......... *B01D 61/06* (2013.01); *B01D 61/025* (2013.01); *B01D 61/04* (2013.01); *B01D 61/08* (2013.01); *C02F 1/441* (2013.01); *B01D 2313/246* (2013.01); *C02F 2103/08* (2013.01); *C02F 2303/10* (2013.01)

(58) Field of Classification Search
None
See application file for complete search history.

(56) References Cited

U.S. PATENT DOCUMENTS 4,966,708 A * 10/1990 Oklejas ................ B01D 61/022
210/321.65
6,139,740 A * 10/2000 Oklejas ................ B01D 61/022
210/321.66

(Continued)

OTHER PUBLICATIONS

International Search Report and Written Opinion dated Aug. 7, 2020 in corresponding PCT Application No. PCT/US2020/019816.

*Primary Examiner* — Krishnan S Menon
(74) *Attorney, Agent, or Firm* — Harness, Dickey & Pierce, P.L.C.

(57) ABSTRACT

A reverse osmosis system includes a first pretreatment system and a fluid source located below a reservoir. A first membrane housing has a reverse osmosis membrane therein. A first turbocharger includes a first pump portion and a first turbine portion. The first pump portion receives feed fluid from the first pretreatment system, pressurizing the feed fluid and communicates the feed fluid to the feed fluid inlet. The first turbine portion receives brine fluid from the brine outlet. The system further includes a second and third turbocharger. A second turbine portion and the third turbine portion receive brine fluid from the first turbine portion. Second feed fluid is communicated through a booster pump, a second pretreatment system, and second pump portion to increase a pressure of the second feed fluid. The second feed fluid is communicated to the third pump portion which communicates the pressurized second feed fluid to the first pump portion.

17 Claims, 19 Drawing Sheets

(56) References Cited

U.S. PATENT DOCUMENTS

| | | | |
|---|---|---|---|
| 2006/0065597 A1* | 3/2006 | Kunczynski | B01D 61/06 |
| | | | 210/637 |
| 2007/0181473 A1* | 8/2007 | Manth | B01D 61/06 |
| | | | 210/137 |
| 2008/0105617 A1* | 5/2008 | Oklejas | C02F 1/441 |
| | | | 210/637 |
| 2011/0198290 A1* | 8/2011 | Oklejas, Jr. | C02F 1/441 |
| | | | 210/652 |
| 2012/0061300 A1 | 3/2012 | Matsushiro et al. | |
| 2012/0285886 A1* | 11/2012 | Liberman | B01D 65/08 |
| | | | 210/636 |
| 2018/0290902 A1 | 10/2018 | Aronson et al. | |
| 2019/0092656 A1* | 3/2019 | Oklejas, Jr. | B01D 61/12 |

* cited by examiner

METHOD AND SYSTEM FOR PERFORMING REVERSE OSMOSIS WITH INTEGRATED PUMP STORAGE

RELATED APPLICATION

This application is a non-provisional application of provisional application 62/810,407 filed Feb. 26, 2019, and provisional application 62/830,705 filed Apr. 8, 2019. The disclosures of which are incorporated by reference herein.

TECHNICAL FIELD

The present disclosure relates generally to reverse osmosis systems, and, more specifically, to methods and systems for using an elevated reservoir for supplying feed for reverse osmosis.

BACKGROUND

The statements in this section merely provide background information related to the present disclosure and may not constitute prior art.

Reverse osmosis systems typically use a lot of energy during the process. Reverse osmosis systems use a membrane within a membrane housing to separate a stream of liquid (feed) containing dissolved solids into two streams. The first stream is a pure liquid that is formed by passing fluid through the membrane of the reverse osmosis system. This is referred to as permeate. A second stream of liquid also leaves the membrane housing and has a higher concentration of dissolved solids, which is referred to as brine fluid or reject. Pump storage hydraulic energy systems are one way to reduce the overall costs of the system by reducing energy costs.

Referring now to FIG. 1, a reverse osmosis system 10 according to the prior art is set forth. The reverse osmosis system 10 has a reverse osmosis membrane housing 12 that has a membrane 14 disposed therein. The membrane housing 12 has a feed fluid inlet 12A, a brine outlet 12B, and a permeate outlet 12C. As briefly mentioned above, feed fluid enters the feed fluid inlet 12A and, with the membrane 14, divides the fluid into a permeate stream exiting the membrane housing 12 at the permeate outlet 12C and a brine stream at the brine outlet 12B. Feed fluid is provided to the feed fluid inlet 12A from a fluid source 18 through a pipe 22, a booster pump 20, a pipe 24, a pretreatment system 26, a pipe 28, a high pressure pump 30 and a pipe 32. The pipe 32 is coupled to a turbocharger 40 that has a pump portion 40A and a turbine portion 40B. The turbocharger 40 may have a common shaft 41 coupling the pump portion 40A to the turbine portion 40B.

The pump portion 40A is in fluid communication with the feed fluid inlet 12A through a pipe 44. The brine outlet 12B is coupled to a pipe 46 which in turn communicates brine fluid to the turbine portion 40B. A drain 48 receives the brine from the turbine portion 40B. Because the brine fluid within the brine pipe 46 is highly pressurized, the turbine portion 40B uses the energy of the brine fluid to rotate the pump impeller within the pump portion 40A and to increase the pressure of the feed fluid. This reduces the amount of pressure required to be generated at the high pressure pump 30. The brine fluid exiting the turbine portion 40B has its energy reduced and thus low pressure brine fluid is communicated to the drain 48.

Referring now to FIG. 2, a pump storage system 60 according to the prior art is illustrated. The pump storage system 60 is used to accumulate or store hydraulic energy for later use when needed. The fluid source 18 is located at a lower elevation than a reservoir 62. The reservoir 62 may be a tank or storage pond. The reservoir 62 has a water level 64. The reservoir 62 is located at an elevated portion of land 66. A pump-turbine 68 is a combination of a pump this is capable of pumping fluid to the reservoir 62 and act as a turbine drawing fluid from the reservoir 62. The reservoir 62 is disposed a predetermined distance D above the pump-turbine 68. A pipe or penstock 70 communicates fluid to and from the reservoir 62 and the pump-turbine 68.

To use electrical resources efficiently, the pump-turbine 68 pumps water from the fluid source 18 to the reservoir 62 when electrical energy is cheap or abundant. When there is an increased demand for electrical energy, water is released from the reservoir 62 and passes through the penstock 70 to the pump-turbine 68 which generates electrical power to be returned to the grid or stored in a battery system at the generator 72. The generator 72 acts as a motor when pumping water to the reservoir 62 and a generator when water is released from the reservoir to generate electricity. It is not uncommon for the reservoir 62 to encompass many acres of land. Because of geographical limitations, finding an area of land that is adjacent to a large body of water and has suitable elevations is difficult.

Referring now to FIG. 3, a reverse osmosis membrane housing 12 is incorporated into the prior art system of FIG. 2. As well, the pretreatment system 26 is shown in communication with the feed fluid inlet 12A. The pump-turbine 68 is in communication with alternate forms of energy such as solar panels 76 and wind turbines 78. Solar panels 76 and wind turbines 78 are unpredictable power sources that are coupled to the pump-turbine 68 through wires 80, 82, respectively. The pump-turbine 68 operates at a speed that is consistent with the available power from the solar panels 76, the wind turbines 78, and the elevated water from the reservoir 62. The reverse osmosis system is most efficient when operating at a relatively steady flow and pressure. The pump-turbine 68 may be used to provide fluid from the fluid source 18 when the solar or wind power are in excess. When the solar power or wind power are in excess, the penstock 70 receives fluid pumped from the fluid source 18 by way of the pump-turbine 68. The pump-turbine 68 also provides the reverse osmosis housing 12 with fluid and adds to fluid from the reservoir 62 when the amount of fluid from the pump-turbine 68 is not adequate.

Referring now to FIG. 4, the turbocharger 40 and the membrane housing 12 of FIG. 1 are incorporated into the prior art system. In this example, the pretreatment system 26 is disposed at the same elevation as the turbocharger 40. The turbocharger 40 receives brine fluid from the brine outlet 12B, which is used to pressurize the feed fluid at the pump portion 40A. Typically, the pump section may raise the feed pressure by about 30 bar, and thus the inlet pressure to the pump is about 30 to 50 bar. The elevation of the reservoir 62 is between 300 and 350 meters, which is reduced from 600 meters in the previous examples and thus the development site costs are reduced. This also increases the amount of development sites possible. The change from 600 to 650 meters or 300 to 350 meters corresponds to systems that do not use versus systems that use a turbocharger, respectively. A large area of land coupled with the need for being close to a large body of seawater is typically very expensive. The required membrane pressure varies due to changes in the feed temperature, the feed water solidity, and the age of the membranes. Therefore, no single reservoir height optimally meets all the membrane operating requirements.

The pretreatment system 26 illustrated in FIG. 3 exposes the equipment to high pressures. The high pressures may approach 65 bar when a turbocharger is not used or 35 bar when a turbocharger is used. Typically, pretreatment systems are rated between 4 and 6 bars using non-metallic construction. Using high alloy stainless steels in the construction of a pretreatment system increases significantly the expense of such systems. Dissolved air filtration is also a preferred method for pretreatment. However, highly pressurized fluid is provided and thus dissolved air filtration cannot be used by such systems.

SUMMARY

The present disclosure provides a reverse osmosis system and method for operating the same for efficient use of resources in geographic locations having elevated land located adjacent to a fluid source.

In one aspect of the disclosure, a reverse osmosis system is coupled to a reservoir and a fluid source below the reservoir. The system includes a first pretreatment system and a first membrane housing comprising a reverse osmosis membrane therein. The membrane housing comprises a feed fluid inlet, a brine outlet and a permeate outlet. A first turbocharger comprises a first pump portion and a first turbine portion. The first pump portion receives feed fluid from the first pretreatment system, pressurizing the feed fluid and communicating the feed fluid to the feed fluid inlet. The first turbine portion receives brine fluid from the brine outlet. A second turbocharger comprises a second pump portion and a second turbine portion. A third turbocharger comprising a third pump portion and a third turbine portion. The second turbine portion and the third turbine portion receives brine fluid from the first turbine portion. The system further comprises a second pretreatment system and a booster pump in series with the second pretreatment system. The second pretreatment system communicates second feed fluid to the second pump portion to increase a pressure of the second feed fluid. The second pump portion communicates second feed fluid to the third pump portion to increase the pressure of the second feed fluid. The third pump portion communicates the second feed fluid to the first pump portion.

In yet another aspect of the disclosure. a method of operating the system of the preceding paragraph comprises communicating fluid to a fluid reservoir from the fluid source through a pump-turbine, communicating the fluid through the first pretreatment system to form feed fluid, pressurizing the feed fluid at the first pump portion, communicating the feed fluid to the first feed fluid inlet from the first pump portion, communicating brine fluid from the first brine outlet of first membrane housing to the first turbine portion to operate the first pump portion, communicating brine fluid from the first turbine portion to the second turbine portion to operate the second pump portion and the third turbine portion to operate the third pump portion, communicating second feed fluid from the fluid source through the second pretreatment system to the second pump portion, increasing a pressure of the second feed fluid at the second pump portion, thereafter, communicating the second feed fluid to the third pump portion to increase the pressure of the second feed fluid and communicating the second feed fluid from the third pump portion to the first pump portion.

In another aspect of the disclosure, a reverse osmosis system coupled to a reservoir and a fluid source below the reservoir includes a first pretreatment system and a first membrane housing comprising a first reverse osmosis membrane therein. The first membrane housing comprises a first feed fluid inlet, a first brine outlet and a first permeate outlet. A second membrane housing of the system comprises a second reverse osmosis membrane therein. The second membrane housing comprises a second feed fluid inlet, a second brine outlet and a second permeate outlet. A first turbocharger comprises a first pump portion and a first turbine portion. The first pump portion receives feed fluid from the pretreatment system, pressurizes the feed fluid and communicates the feed fluid to the feed fluid inlet. The first turbine portion receives brine fluid from the brine outlet. A second turbocharger comprises a second pump portion and a second turbine portion. A third turbocharger comprises a third pump portion and a third turbine portion. The second turbine portion and the third turbine portion receive brine fluid from the first turbine portion. A booster pump in series with the first pretreatment system communicates second feed fluid to the first pump portion to increase a pressure of the feed fluid. The second pump portion increases the pressure of the feed fluid and communicates the feed fluid to the first feed fluid inlet. The first brine outlet couples first brine fluid to the second feed fluid inlet through the third pump portion. The second brine outlet fluidically is coupled to the third turbine portion and wherein the third turbine portion drives the third pump portion. The third turbine portion communicates the second brine fluid to the first turbine portion. The second turbine portion drives the second pump portion.

In another aspect of the disclosure, a method for operating the system of the preceding paragraph comprises communicating fluid to a fluid reservoir from the fluid source through a pump-turbine, communicating fluid from the reservoir to the first turbine portion, said first turbine portion operating the first pump portion, communicating the fluid from the first turbine portion through the pretreatment system to form feed fluid, pressurizing the feed fluid at a booster pump and the first pump portion, communicating the feed fluid to the feed fluid inlet through the first pump portion and the second pump portion, communicating brine fluid from the first brine outlet of first membrane housing to the feed fluid inlet of the second membrane housing through the third pump portion, communicating brine fluid from the second brine outlet to the third turbine portion to operate the third pump portion, and communicating brine fluid from the third turbine portion to the second turbine portion to operate the second pump portion.

In yet another aspect off the disclosure, a reverse osmosis system is coupled to a reservoir and a fluid source below the reservoir. The system comprises a first pretreatment system, a booster pump, and a first membrane housing comprising a first reverse osmosis membrane therein. The first membrane housing comprises a first feed fluid inlet, a first brine outlet and a first permeate outlet. A first turbocharger comprises a first pump portion and a first turbine portion. The first turbine portion receives feed fluid from the reservoir. The first pump portion receives feed fluid from first turbine portion through the pretreatment system and the booster pump. The first pump portion pressurizes the feed fluid. A second turbocharger comprises a second pump portion and a second turbine portion. The first pump portion communicates the feed fluid to the feed fluid inlet through the second pump portion. The second turbine portion receives brine fluid from the brine outlet. The second pump portion increases the pressure of the feed fluid and communicates the feed fluid to the first feed fluid inlet. The first brine outlet couples first brine fluid to the second turbine portion.

In another aspect of the disclosure, a method of operating the system in the preceding paragraph includes communicating fluid to a fluid reservoir from the fluid source through a pump-turbine, communicating fluid from the reservoir to the first turbine portion, said first turbine portion operating the first pump portion, communicating the fluid from the first turbine portion through the pretreatment system to form feed fluid, pressurizing the feed fluid at a booster pump and the first pump portion, communicating the feed fluid to the feed fluid inlet through the first pump portion and the second pump portion, and communicating brine fluid from the first brine outlet of first membrane housing to the second turbine portion to operate the second pump portion.

In another aspect of the disclosure, a reverse osmosis system is coupled to a fluid reservoir having a surface. The system includes a pretreatment system fluidically coupled to the fluid reservoir disposed a predetermined distance below the fluid reservoir. A membrane housing comprising a reverse osmosis membrane therein. The membrane housing comprises a feed fluid inlet, a brine outlet and a permeate outlet. A first turbocharger comprises a first pump portion and a first turbine portion. The first pump portion is fluidically coupled to the fluid reservoir through the pretreatment system. A second turbocharger comprises a second pump portion and a second turbine portion. The brine outlet is coupled to the second turbine portion. The first pump portion is in fluid communication with the feed fluid inlet through the second pump portion. The first turbine portion fluidically coupled to the reservoir.

In another aspect of the disclosure, a method of operating the reverse osmosis system of the previous paragraph comprises communicating untreated fluid to a fluid reservoir from the fluid source through a pump-turbine, communicating untreated fluid from the reservoir to the first turbine portion, said first turbine portion operating the first pump portion, communicating the untreated fluid from the reservoir through the pretreatment system to the first pump portion to form feed fluid, pressurizing the feed fluid at the first pump portion, communicating the feed fluid to the feed fluid inlet through the first pump portion and the second pump portion and communicating brine fluid from the first brine outlet of first membrane housing to the second turbine portion to operate the second pump portion.

In another aspect of the disclosure, a reverse osmosis system coupled to a fluid reservoir has a surface. The system includes a pretreatment system fluidically coupled to the fluid reservoir disposed a first predetermined distance below the fluid reservoir, a membrane housing comprising a reverse osmosis membrane therein. The membrane housing comprises a feed fluid inlet, a brine outlet and a permeate outlet. A first turbocharger comprises a first pump portion and a first turbine portion. The brine outlet is coupled to a first pipe directing brine fluid to the first turbine portion. The first pump portion is in fluid communication with the feed fluid inlet. The brine outlet is coupled to a first turbine portion.

In yet another aspect of the disclosure. a method of operating the system of the preceding paragraph comprises communicating fluid to a fluid reservoir from the fluid source through a pump-turbine, communicating the fluid from the reservoir through the pretreatment system to the first pump portion to form feed fluid, pressurizing the feed fluid at the first pump portion, communicating the feed fluid to the feed fluid inlet through the first pump portion and communicating brine fluid from the first brine outlet of first membrane housing to the first turbine portion to operate the first pump portion.

In another aspect of the disclosure, a reverse osmosis system is coupled to a reservoir and a fluid source below the reservoir. The system comprises a storage bag disposed in the reservoir, a pretreatment system communicating the fluid source to the storage bag and a membrane housing comprising a reverse osmosis membrane therein. The membrane housing comprises a feed fluid inlet, a brine outlet and a permeate outlet. A first turbocharger comprises a first pump portion and a first turbine portion. The brine outlet is coupled to a first pipe directing brine fluid to the first turbine portion. The first pump portion couples feed fluid in the storage bag to the feed fluid inlet. The brine outlet is coupled to a first turbine portion.

In yet another aspect of the disclosure, a method of operating a reverse osmosis system includes communicating fluid to a fluid reservoir from the fluid source through a pump-turbine, communicating fluid from the fluid source through a low pressure pump booster pump to the pretreatment system to form feed fluid, communicating the feed fluid through a high pressure pump to a bag in the reservoir, communicating the feed fluid from the bag in the reservoir to the first pump portion, pressurizing the feed fluid at the first pump portion, communicating the feed fluid to the feed fluid inlet through the first pump portion and communicating brine fluid from the first brine outlet of first membrane housing to the first turbine portion to operate the first pump portion.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
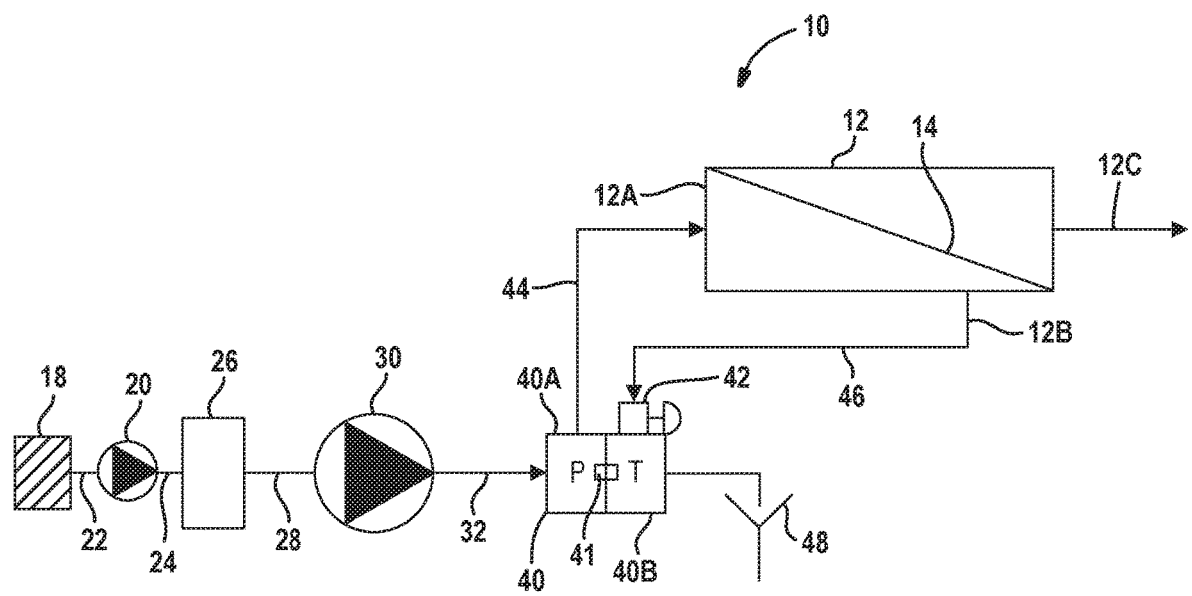
FIG. 1 is a schematic view of a reverse osmosis system having a turbocharger according to the prior art.
Figure 2:
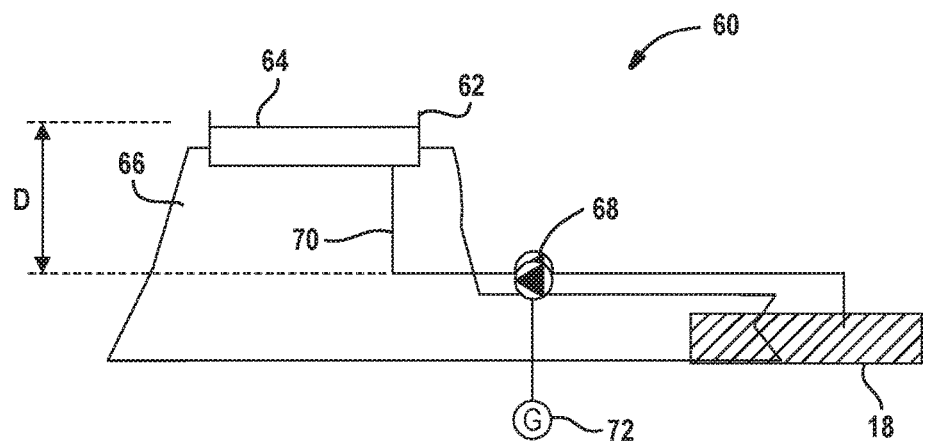
FIG. 2 is a schematic view of an elevated reservoir system according to the prior art.
Figure 3:
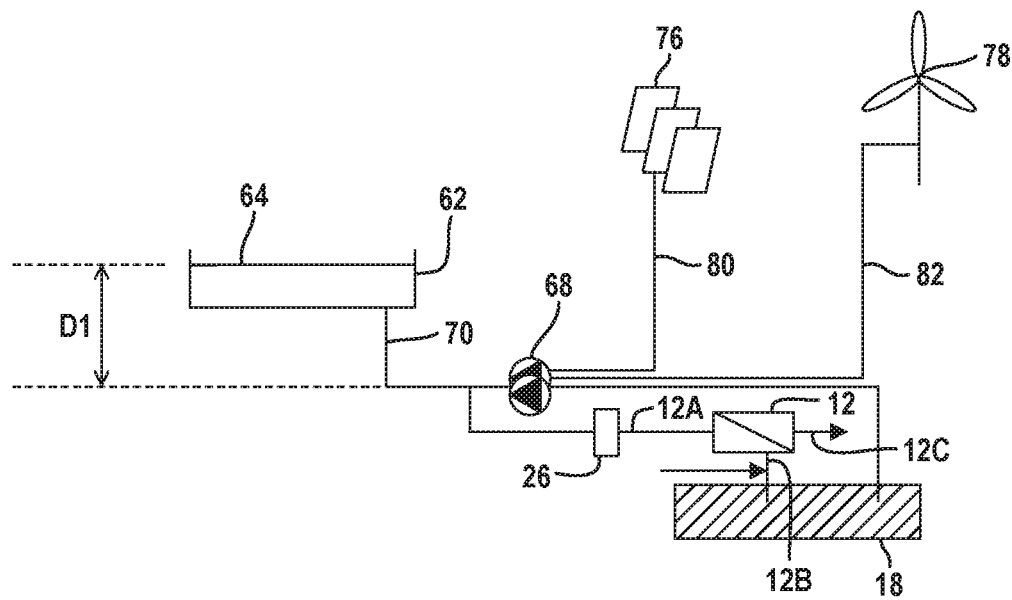
FIG. 3 is a schematic view of a reverse osmosis system powered according to alternative energy prior art.
Figure 4:
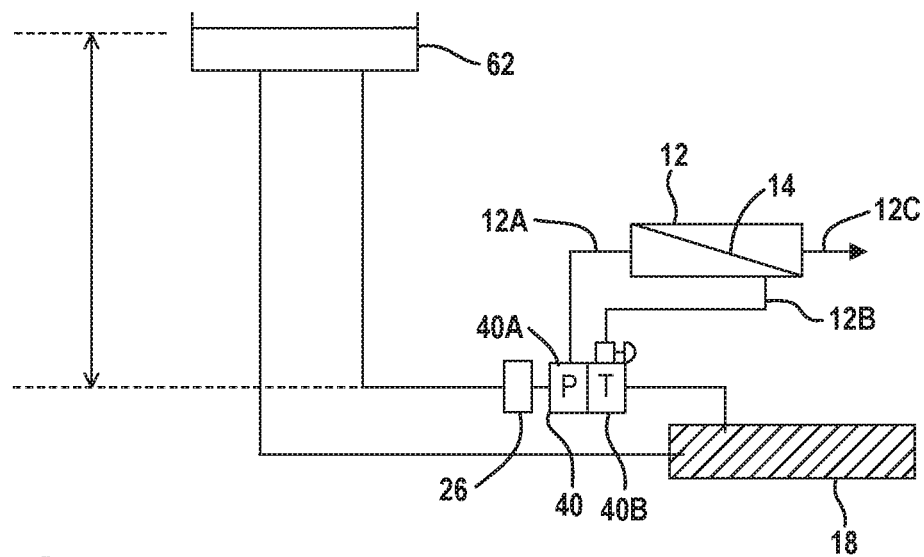
FIG. 4 is a schematic view of a reverse osmosis system with a turbocharger according to the prior art.

The following description is merely exemplary in nature and is not intended to limit the present disclosure, application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

In the examples below, turbochargers are used as energy recovery devices that use energy in a turbine portion to pressurize fluid at a pump portion. Thus, the energy from the fluid in the turbine stream is recovered. The systems below set forth improvements for reducing energy particularly in elevated areas.

Figure 5A:
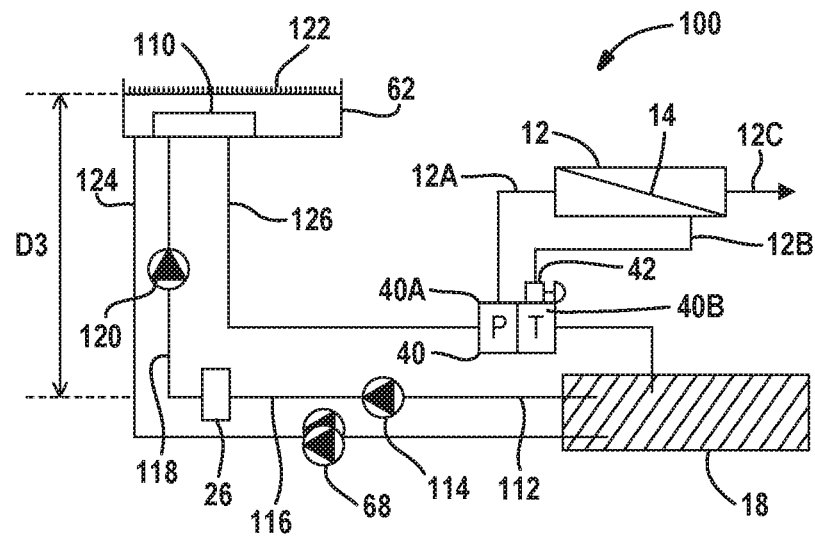
FIG. 5A is a schematic view of an elevated reverse osmosis system reservoir according to the first example of the present disclosure.

Referring now to FIG. 5A, an improved reverse osmosis system 100 is set forth. In this example, the same components in the background are provided with the same reference numerals. In this example, the feed fluid at the pretreatment system 26 is performed at a relatively low pressure. A bag 110 is disposed within the reservoir 62. The bag 110 is a closed volume that does not interact with the other fluid within the reservoir 62. A first pipe 112 communicates fluid from the fluid source 18 to a low pressure booster pump 114. A pipe 116 communicates fluid from the booster pump 114 to the pretreatment system 26. The booster pump 114 pressurizes the feed fluid to a pressure suitable for use in the pretreatment system 26, such as between 3 and 5 bar. A pipe 118 couples the pretreatment system 26 to a high pressure pump 120 provides pressurized fluid to a bag 110 within the reservoir 62. The booster pump 114 thus provides enough pressure to overcome the elevation of the bag 110. The pretreatment system 26 is located at about the same elevation as the fluid source 18. The elevation of the pretreatment system 26 may, for example be within 15 m of the body of water. This allows for the use of a low pressure booster pump 114 to be utilized to move the water from the body of water to the pretreatment system 26.

The reservoir 62 may have a cover 122 disposed thereover to prevent debris from entering into the fluid within the reservoir 62. This is a concern if a bag 110 is not used. With the use of the bag 110, the cover 122 is not required. Untreated water from the fluid source 18 may be provided through the pump-turbine 68 and a pipe 124 to the reservoir 62. The pump-turbine 68 may act as a motor or generator as described above.

A pipe 126 provides pretreated water to the pump portion 40A of the turbocharger 40 which is used in the reverse osmosis process. If a bag 110 is not used, the pipe 126 receives fluid of the turbocharger 40 from the reservoir 62 which is covered by the cover 122. In either case, the pump portion 40A receives pretreated fluid. As will be described in more detail relative to FIG. 7, sensors and a controller may be used to automate the operation of the system.

Figure 5B:
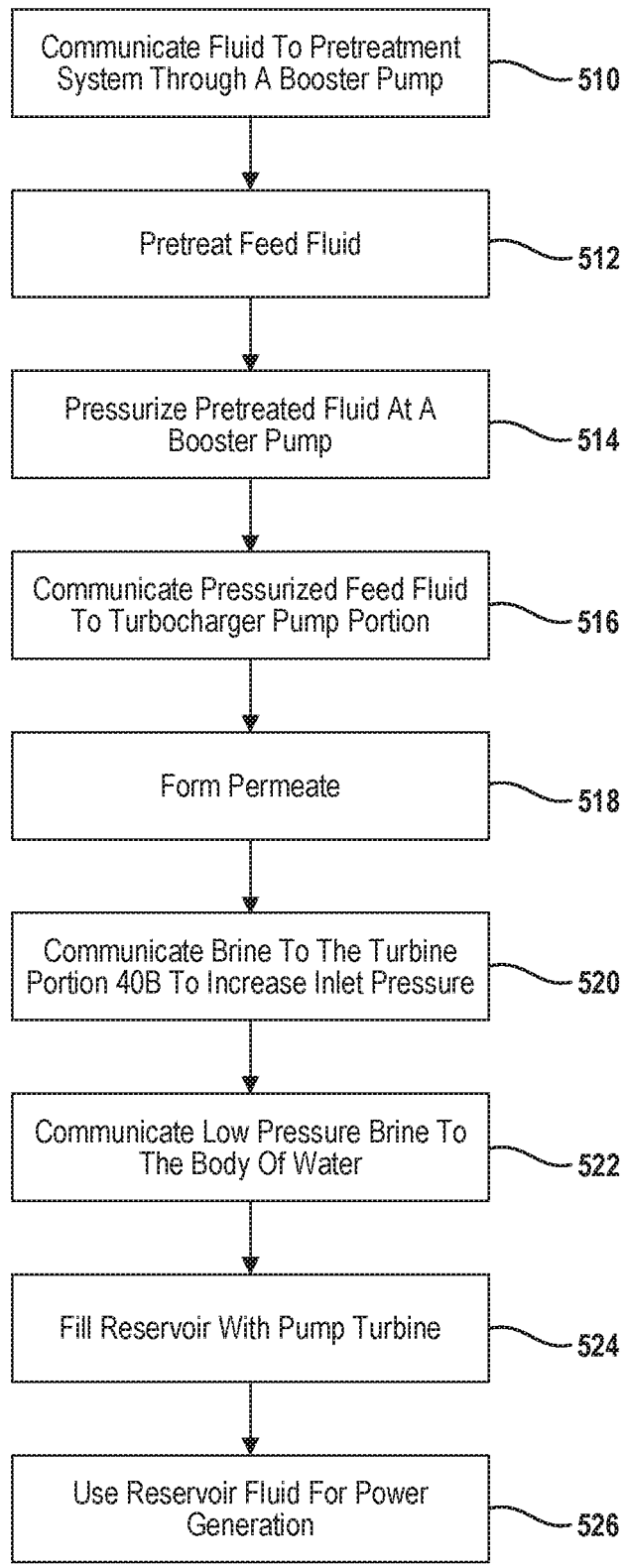
FIG. 5B is a flow chart of a method for operating the system of FIG. 5A.

Referring now to FIG. 5B, a method of operating the system of FIG. 5A is set forth. In step 510 fluid is communicated to the pretreatment system 26 through a low pressure booster pump which boosts the pressure to between 3 and 5 bar. In step 512 the fluid is pretreated using one or more various types of filtration, such as cartridge filters. The pretreated feed fluid is pressurized further at a high pressure pump 120 at step 514 to overcome the elevational change. The pretreated fluid is provided from the high pressure pump 120 to the reservoir 62. When a bag 110 is used, the pretreated fluid is communicated to the bag 110. If the bag 110 is not used, the fluid from the reservoir 62 is used. That is, fluid is communicated to the reverse osmosis process through the pump portion 40A through the pipe 126. The pipe 126 may be a penstock 70. The fluid is pressurized that is received by the pump portion 40A. That is, in step 516 the pressurized feed fluid from the reservoir 62 or more specifically the bag 110, if used, is communicated to the pump portion 40A of the turbocharger 40. The pump portion 40A pressurizes the feed fluid to an increased pressure where it is provided to the reverse osmosis membrane housing 12. Permeate passes through the membrane housing 12 and exits the system through the permeate outlet 12C in step 518. In step 520 brine fluid is communicated form the brine outlet 12B through the brine flow adjustment valve 42 and to the turbine portion 40B of the turbocharger 40. The brine fluid is highly pressurized and turns the pump portion 40A to increase the pressure of the fluid entering the membrane housing 12. In step 522 the depressurized brine fluid is communicated to the fluid source 18.

In step 524, the reservoir is filled with a pump-turbine 68. Thus, pretreated water may be handled by the pretreatment system 26, but the bulk of the water being communicated to the reservoir 62 may be handled by the pump-turbine 68. The pump-turbine 68 may thus be used for providing power to the entire system when the power available to the system is low or inadequate. Thus, the separated pretreated fluid may be used for the reverse osmosis system while the remainder of this fluid within the reservoir 62 may be used for power generation at the pump-turbine 68 in step 526.

Figure 6A:
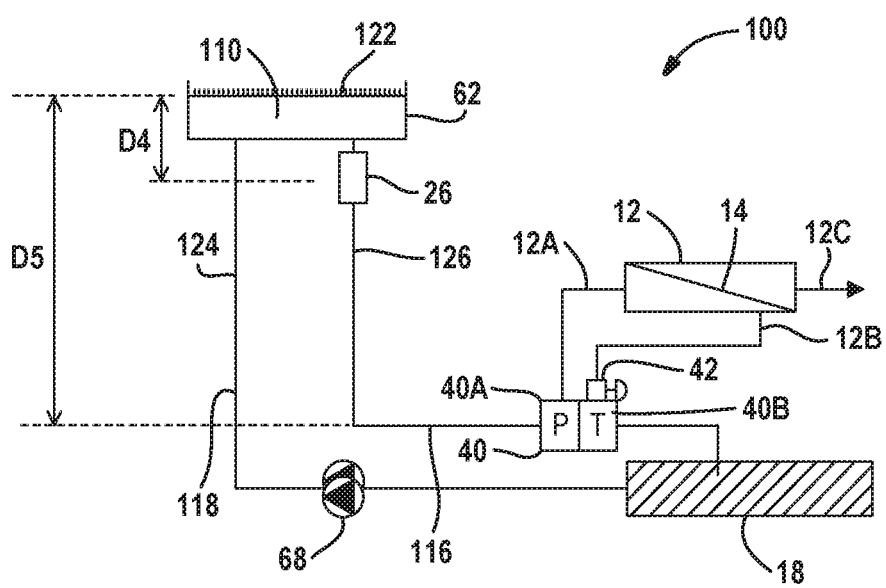
FIG. 6A is a schematic view of an elevated reverse osmosis system reservoir according to the second example of the present disclosure.

Referring now to FIG. 6A, the pretreatment system 26 has been moved adjacent to the reservoir 62. The pretreatment system 26 illustrated in FIG. 6A is about 30-40 meters below the surface of the reservoir at a distance D4. At this location, a booster pump is not required and the elevational head difference provides sufficient pressure, but not too much pressure, for operation of the pretreatment system 26. The turbocharger 40 is located at a distance D5 below the surface of the reservoir 62, such as between 300 and 500 meters below.

Figure 6B:
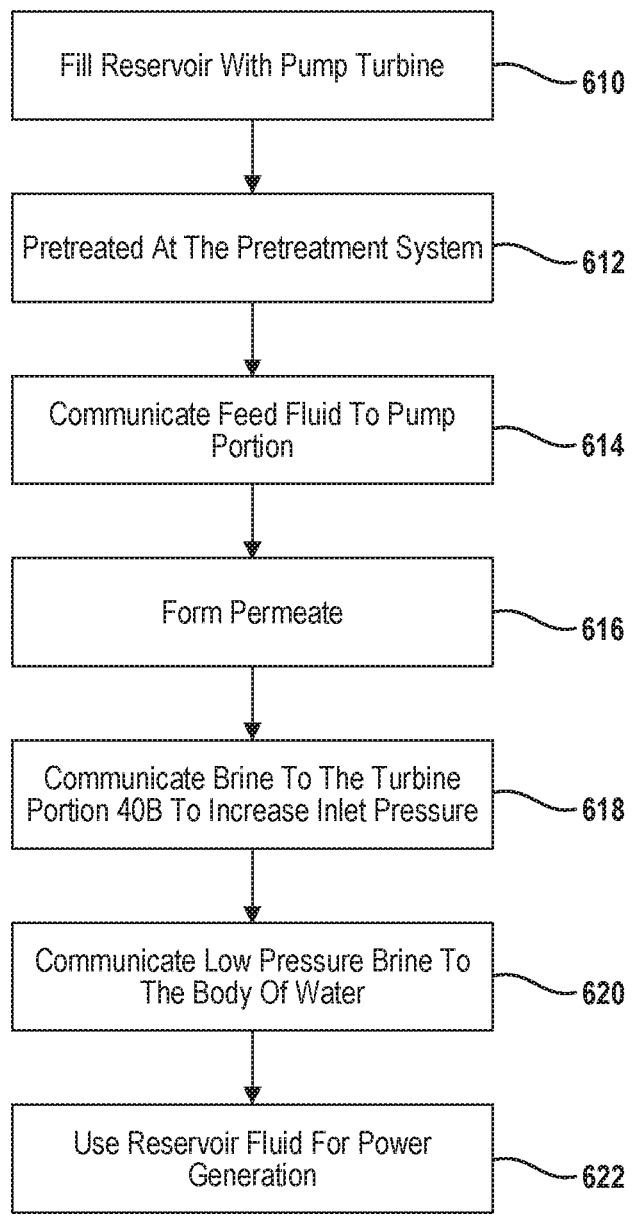
FIG. 6B is a flow chart of a method for operating the system of FIG. 6A.

Referring now to FIG. 6B, the operation of the system in FIG. 6A is set forth. The reservoir 62 may be filled by the pump-turbine 68 at step 610. In step 612, when reverse osmosis is desired, the feed fluid from the reservoir 62 is pretreated at the pretreatment system 26. In step 614, the pretreated feed fluid is communicated to the pump portion 40A of the turbocharger 40. In step 616, permeate is formed through the membrane 14. In step 618, brine fluid is communicated to the turbine portion 40B to increase the inlet feed fluid pressure. Low pressure brine fluid is then communicated to the body of water in step 620. The reservoir fluid may be used for generation of power at the pump-turbine 68 at step 622.

Figure 7A:
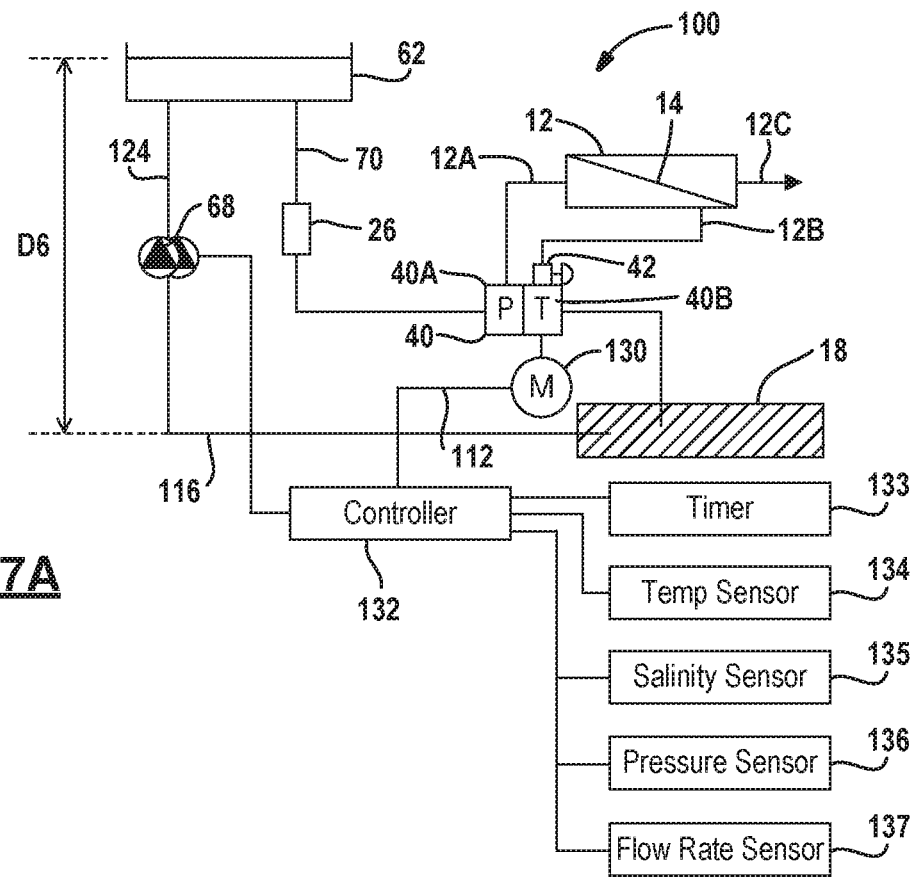
FIG. 7A is a schematic view of an elevated reverse osmosis system reservoir according to the third example of the present disclosure.

Referring now to FIG. 7A, the turbine 40B is provided with a motor 130 that is operated by a controller 132. The motor 130 coupled to the turbine portion 40B allows variable boost from the pump portion 40A that is independent from the power available from the turbine portion 40B. Thus, the feed pressure to the membrane 14 may be maintained at optimal levels to accommodate changes in the reservoir elevation during the design phase, changes in reservoir height during filling and draw down, and changes in the feed conditions and membrane age. That is, the temperature and salinity of the feed water may change and thus the controller 132 may change the speed of the motor 130 in response to the temperature and salinity sensed at a temperature sensor 134 corresponding to the temperature of the water at the body of water. As mentioned above, the salinity may also change and thus a salinity sensor 135 may be coupled to the controller 132 and the speed of the motor 130 may be changed in response to the salinity. Likewise, a timer 133 may be used to time the amount of time since the last membrane change. That is, the timer 133 may generate a signal corresponding to the age of the membrane 14 and thus the speed of the motor 130 may be changed accordingly.

One or more pressure sensors 136 and flow meters 137 may be used throughout the system. Although not specifically illustrated, the pressure sensors 136 may be located before and/or after the pump-turbine 68, before and or after the pretreatment system 26, at the feed fluid inlet 12A, at the brine outlet 12B, at the permeate outlet 12C, before or after the pump portion 40A, before or after the turbine portion 40B and at the drain. The controller 132 may be used to control the brine flow adjustment valve 42 at the turbine, the motor 130, the pump-turbine 68. In addition the sensors described above can be used in any of the example in FIGS. 5A, 6A, 8A, 9A, 10A and 11A including before or after the additional turbochargers, membrane housings and in various piping. Likewise the controller may control the various additional components in the above figures such as additional turbine valves, boost pumps and generators.

In this example, the motor 130 allows a wider range of reservoir elevation values over the fluid source 18. The motor 130 can be used to provide extra rotational force for the turbine portion which in turn provides extra rotational force to the pump portion to increase the pressures generated at the pump portion. For example, the elevation of the reservoir 62 may be between 200 and 400 meters above the fluid source 18.

Figure 7B:
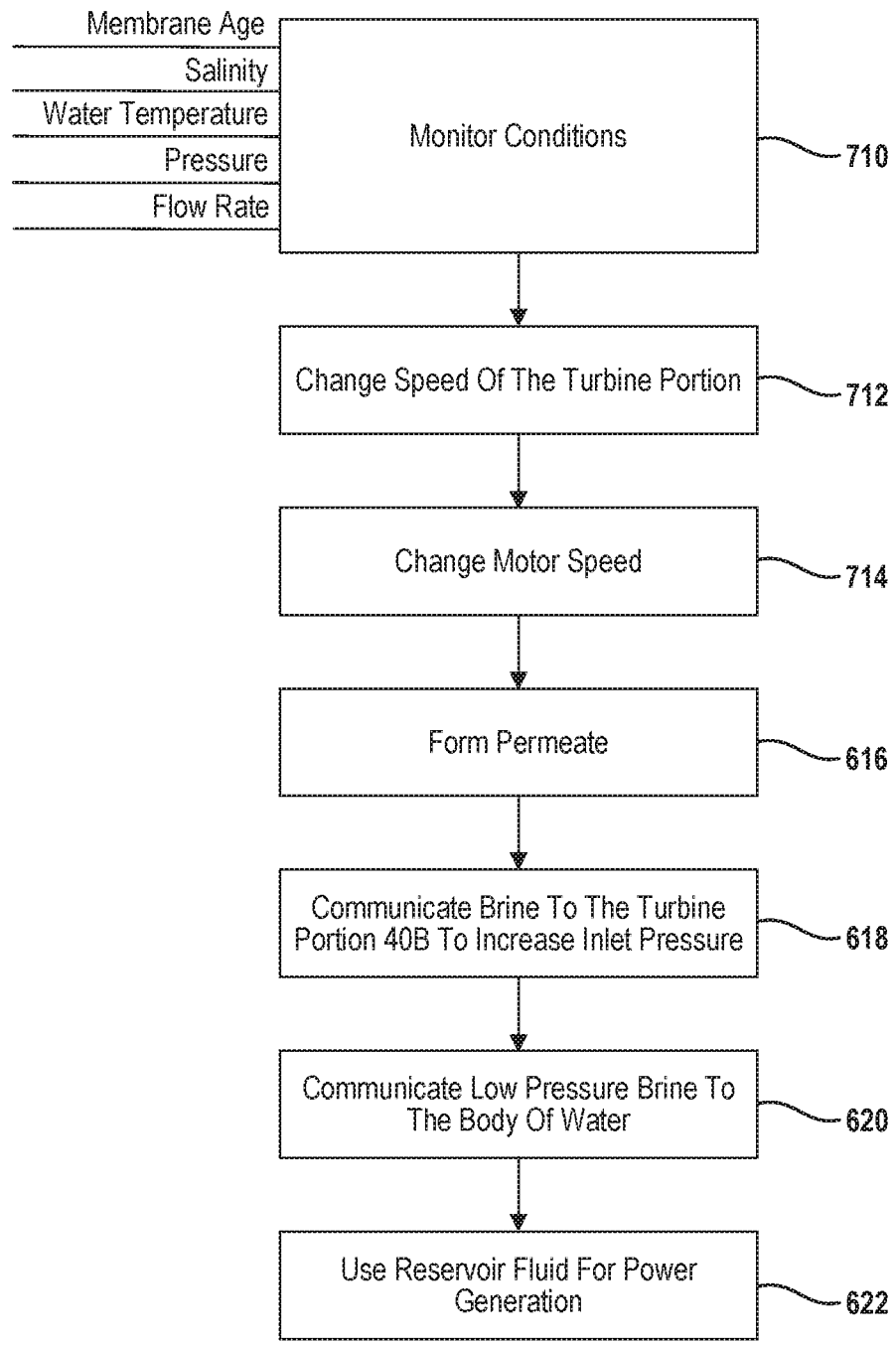
FIG. 7B is a flow chart of a method for operating the system of FIG. 7A.

Referring now to FIG. 7B, various conditions are monitored in step 710. As mentioned above, the membrane age, salinity, and water temperature may be among the conditions monitored. In step 712, the speed of the turbine portion 40B is changed in response to the conditions monitored in step 710. The speed of the turbine portion 40B is changed by changing the motor speed in step 714. The motor speed directly affects the speed of the turbine 40B. The motor speed change in step 714 accommodates for differences in the flow to the turbocharger 40. This allows the distance D6 to be anywhere about 200 meters and about 400 meters above the level of the fluid source 18. After step 714, steps 616-622 are repeated.

In FIGS. 7A and 7B, the cover over the reservoir 62 is not needed because the pretreatment system filters the feed fluid from the reservoir 62 prior to entering the turbocharger 40.

Figure 8A:
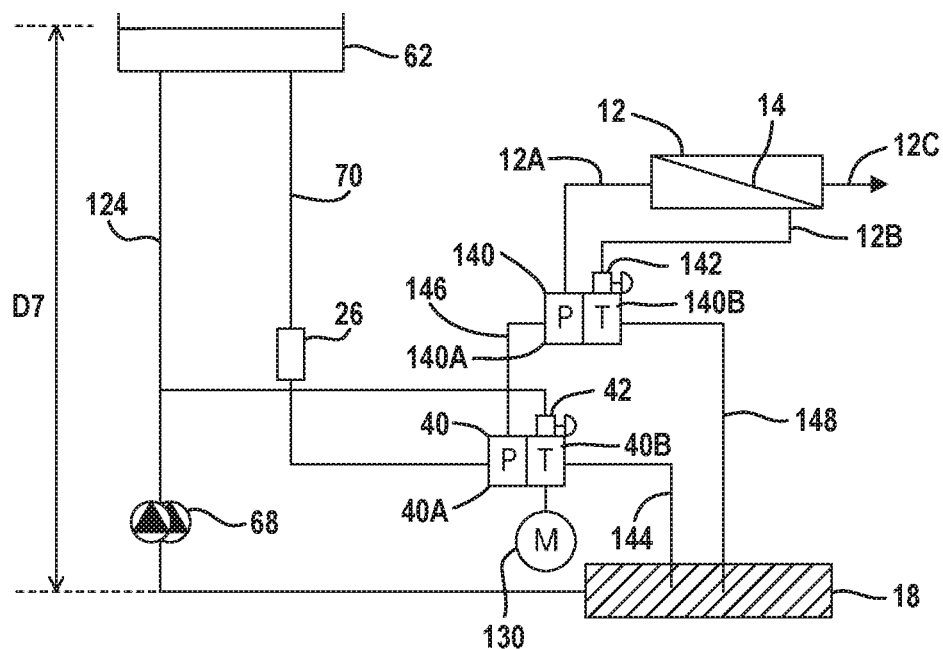
FIG. 8A is a schematic view of a reverse osmosis system with multiple turbochargers according to a fourth example of the present disclosure.

Referring now to FIG. 8A, an example is set forth for even lower reservoir elevations. The distance D7 corresponds to reservoir heights of around 200 meters. In this example, a second turbocharger 140 is incorporated into the fluid flow. The turbocharger 40 receives treated feed fluid from the pretreatment system 26. Because of the elevation change, a pressure of about 20 bars is generated based on the elevation and the pumping action of the turbocharger 40. The pump portion 40A communicates pressurized fluid at about 20 bar to the pump portion 140A.

The turbine portion 40B of the turbocharger 40 is fluidically coupled to the pipe 124 between the pump-turbine 68 and the reservoir 62. The pressure in the pipe 124 drives the turbine 40B which may be supplemented by the operation of the motor 130 as described above. The motor 130 may operate with the controller and the timer and sensors illustrated above in FIG. 7A but have not been repeated in this figure. The turbine 40B thus operates with fluid that has not been pretreated. The depressurized fluid from the turbine 40B enters the fluid source 18 through the pipe 144.

Figure 8B:
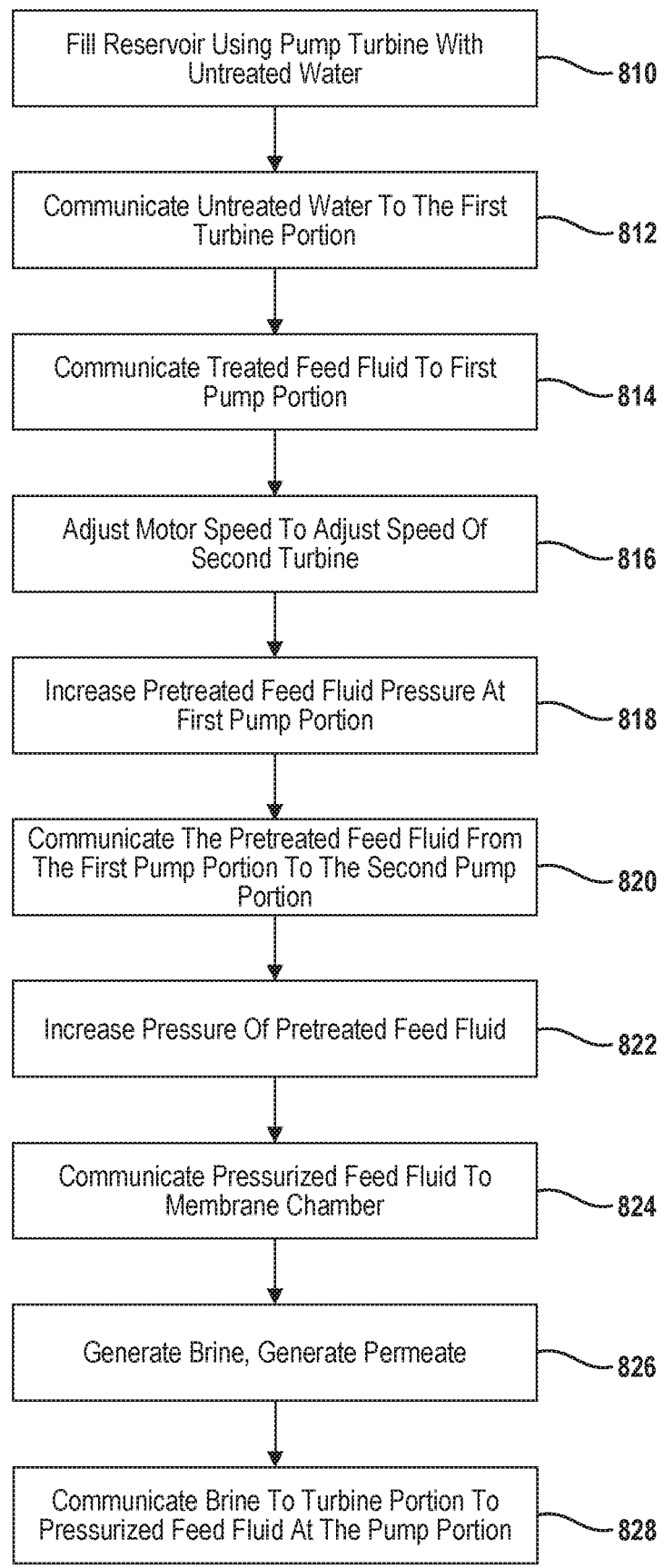
FIG. 8B is a flow chart of a method for operating the system of FIG. 8A.

The pressurized fluid from the pump portion 40A is communicated to the pump portion 140A through a pipe 146. The pump portion 140A raises the pressure of the pretreated feed fluid from the 40 bar pressure generated by the pump portion 40A to about 60 bar, which is a pressure sufficient for the membrane 14. The pressurized fluid from the pump portion 140A is communicated to the feed fluid inlet 12A. Permeate is produced at the permeate outlet 12C for fluid that passes through the membrane 14. The brine outlet 12B is in fluid communication with the turbine portion 140B through the brine flow adjustment valve 142. The turbine portion 140B rotates the pump portion 140A to add the 20 bar of pressure to the fluid received at the turbocharger 140. A pipe 148 in fluid communication with the turbine portion 140B communicates low pressure brine fluid to the fluid source 18. The total boost of the two turbochargers would typically be 60 bar although the contribution by each turbocharger will be dependent in specific process conditions Referring now to FIG. 8B, the reservoir 62 is filled using the pump-turbine 68 through a pipe 124. In step 812, the untreated water within the pipe 124 may also be communicated to the turbine portion 40B and returned to the fluid source 18. In step 814, pretreated feed fluid is communicated to the first pump portion 40A. In step 816, the speed of the motor 130 is adjusted to compensate for various conditions such as the age of the membrane 14, the temperature of the feed fluid, the salinity of the feed fluid, and the pressure of the feed fluid at the turbine portion 40B. In step 820, the pretreated fluid from the first pump portion 40A is communicated to the second pump portion 140A. In step 822, the pump portion 140A further increases the pressure of the pretreated feed fluid. In step 824, the pressurized feed fluid from the pump portion 140A is communicated to the feed fluid inlet 12A of the membrane housing 12. In step 826, the membrane housing generates brine fluid at high pressure and permeate. In step 828, the pressurized brine fluid from the brine outlet 12B is communicated through the brine flow adjustment valve 142 to the turbine portion 140B where the pressure is used to rotate the turbine portion 140B, which in turn rotates or drives the pump portion 140A to increase the pressure of the incoming feed fluid. The turbine portion 140B communicates the depressurized brine fluid to the fluid source 18. The brine fluid is communicated to the turbine portion 140B which drives the pump portion 140A to pressurize the feed fluid.

Additional turbochargers may be added to boost the feed pressure from the pretreatment system as needed to meet the feed fluid inlet pressure of the turbocharger 40. The elevation may be decreased to 100 meters or less using turbochargers in series on the feed stream and parallel on the water from the reservoir. This allows the number of locations that such a system may be implemented to increase.

Figure 9A:
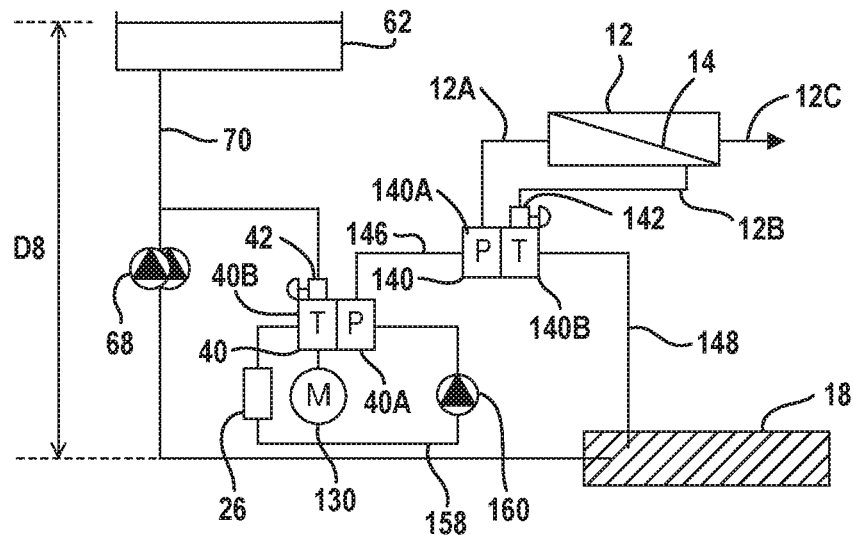
FIG. 9A is a schematic view of a fifth example of a system having a pretreatment system near the body of water in elevation.

Referring now to FIG. 9A, another example of a system that includes two turbochargers is set forth. In this example, the pretreatment system 26 is located at a lower elevation such as near the elevation of the fluid source 18. In this example, non-pretreated water from the penstock 70 is communicated to the first turbine portion 40B through the brine flow adjustment valve 42. Fluid from the turbine portion 40B is communicated to the pretreatment system 26 through pipe 158A and a booster pump 160 to the first pump portion 40A. That is, all of the fluid from the turbine portion 40B is communicated to the pump portion 40A after being depressurized at the turbine portion 40B and pretreated through the pretreatment system 26 at a low pressure. The pressure of the feed fluid is increased at the booster pump 160. The pressure of the feed fluid is then further increased at the pump portion 40A. The energy of the depressurized fluid is applied to the same fluid on the pump portion after pretreatment. Advantageously, pretreatment is at a lower pressure and the system components are less expensive.

The pump portion 40A is in fluid communication with the pump portion 140A through the pipe 146 in a similar manner to that illustrated in FIG. 8A. The feed fluid is further increased in pressure at the pump portion 140A where it is communicated to the feed fluid inlet 12A. The brine fluid generated at the membrane housing 12 is communicated through the brine flow adjustment valve 142 to the turbine portion 140B where the pressure is increased for the feed fluid. Pipe 148 communicates the depressurized brine fluid to the fluid source 18.

Figure 9B:
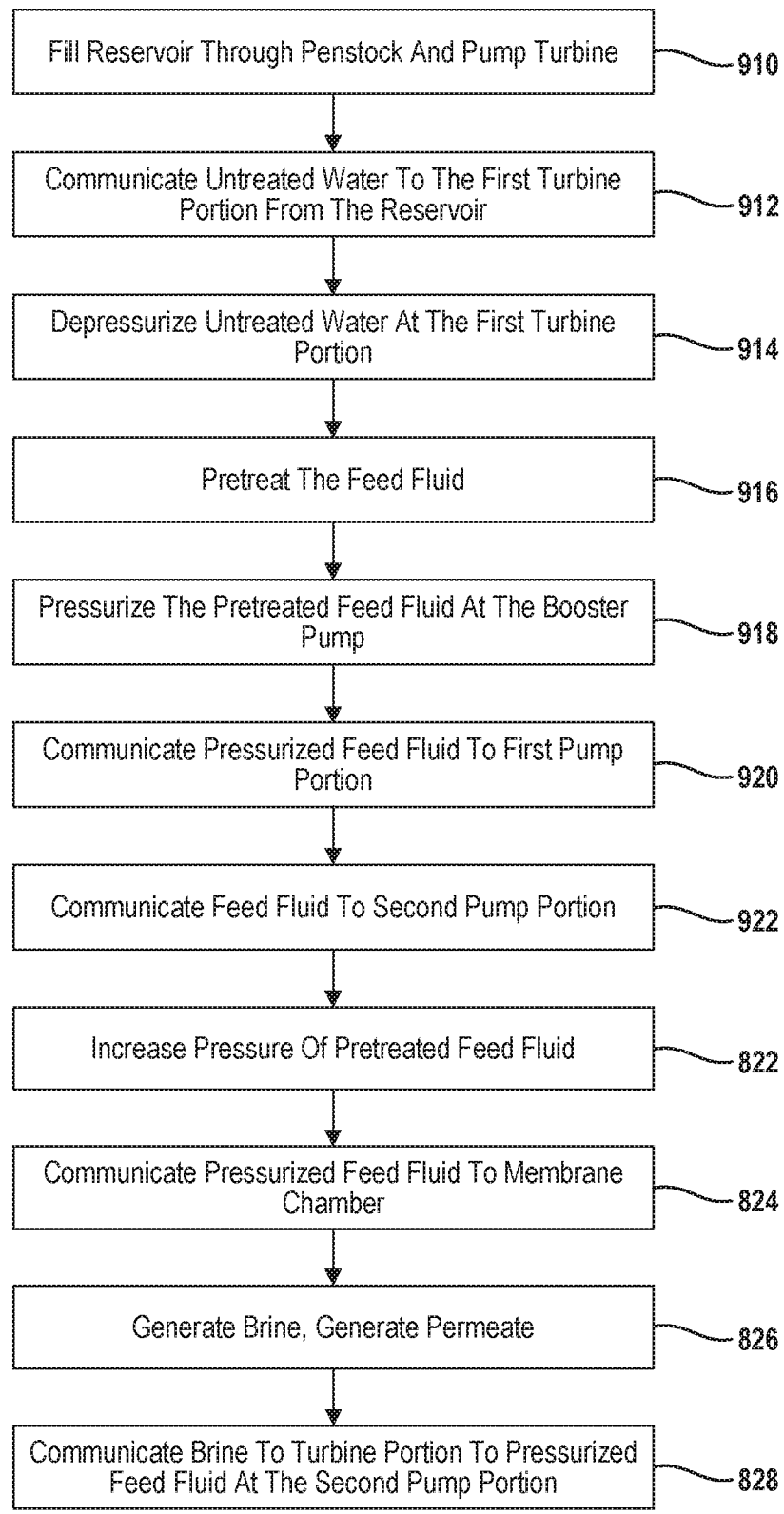
FIG. 9B is a flow chart of a method for operating the system of FIG. 9A.

Referring now to FIG. 9B, a method of operating the system illustrated in FIG. 9A is set forth. In step 910, the reservoir 62 is filled using the pump-turbine 68 and the penstock 70. The reservoir 62 is filled with non-pretreated fluid. In step 912, untreated water is communicated to the first turbine portion 40B through the pipe or penstock 70. The turbine portion 40B depressurizes the untreated water at the first turbine portion 40B in step 914. The untreated water becomes feed fluid by pretreating the untreated water at the pretreatment system 26 is step 916. In step 918, the pretreated feed fluid is pressurized at the booster pump 160. The booster pump 160 communicates the pressurized and pretreated feed fluid to the pump portion 40A where the feed fluid is further pressurized by action of the motion of the first turbine portion 40B. That is, the pressurization step 914 results in the re-pressurizing of the feed fluid at the pump portion 40A. The pressurized feed fluid from the pump portion 40A is communicated to the pump portion 140A through the pipe 146. Steps 822-828 are performed in a similar manner and are therefore not repeated in FIG. 9B.

Figure 10A:
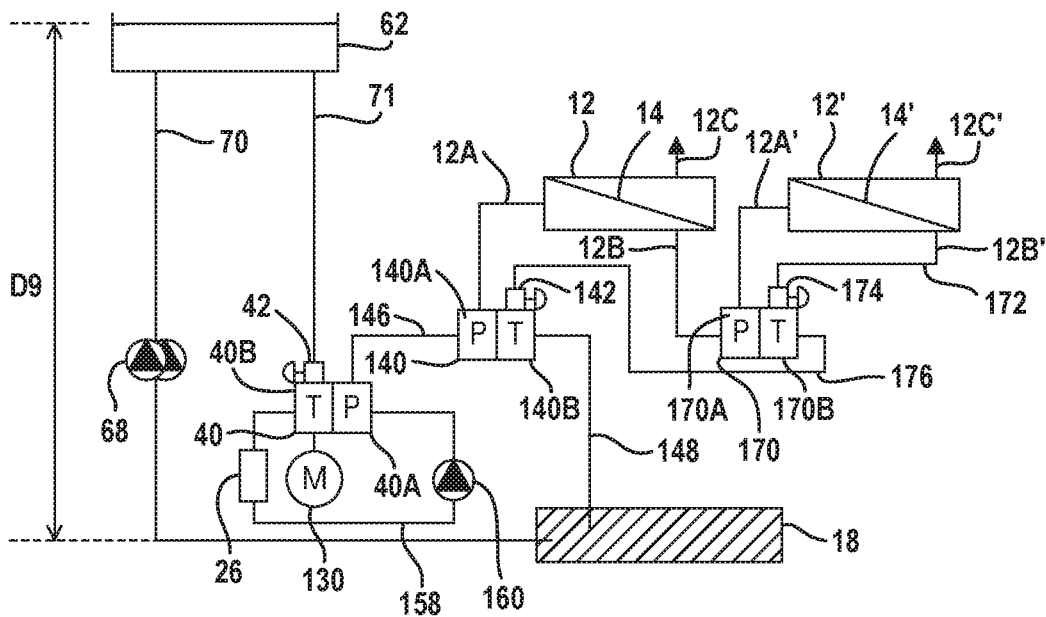
FIG. 10A is a schematic view of a dual membrane housing reverse osmosis system according to a sixth example of the present disclosure.

Referring now to FIG. 10A, additional permeate may be recovered from the feed from the penstock 70 using an additional membrane housing 12'. The membrane housing 12' adds a membrane 14', a feed fluid inlet 12A', a permeate outlet 12C', and a brine outlet 12B'. A third turbocharger 170 is also used. In this example, the fluid is communicated through the same paths except that the penstock 71 having the turbocharger 40 has been separated from penstock 70 which has the pump-turbine 68. The feed fluid flows through the penstock 71 to the turbocharger 40 and through the pretreatment system 26 and the booster pump 160 as described above. Fluid is communicated from the pump portion 40A through the pipe 146 to the second pump portion 140A. In this example, however, the brine outlet 12B is coupled to the third pump portion 170A of the turbocharger 170. The pump portion 170A pressurizes the brine fluid to a higher pressure prior to communicating the brine fluid to the second feed fluid inlet 12A' of the second membrane housing 12'. The membrane 14' generates permeate which exits the membrane housing 12' through the permeate outlet 12C'. Brine exits the second membrane housing 12' through the brine outlet 12B'. A pipe 172 communicates brine fluid from the brine outlet 12B' to the brine flow adjustment valve 174 of the turbocharger 170. More specifically, the brine is communicated to the turbine portion 170B of the turbocharger 170 through the brine flow adjustment valve 174. The pressure in the brine fluid from the brine outlet 12B' is used to pressurize the pump portion 170A to pressurize the input to the second membrane housing 12. Because not all of the pressure is removed at the third turbine portion 170B, the brine fluid is communicated from the third turbine portion 170B to the second turbine portion 140B through a pipe 176. The pressure of the brine fluid within the pipe 176 is used at the second turbine portion 140B to pressurize the feed fluid at the second pump portion 140A.

Figure 10B:
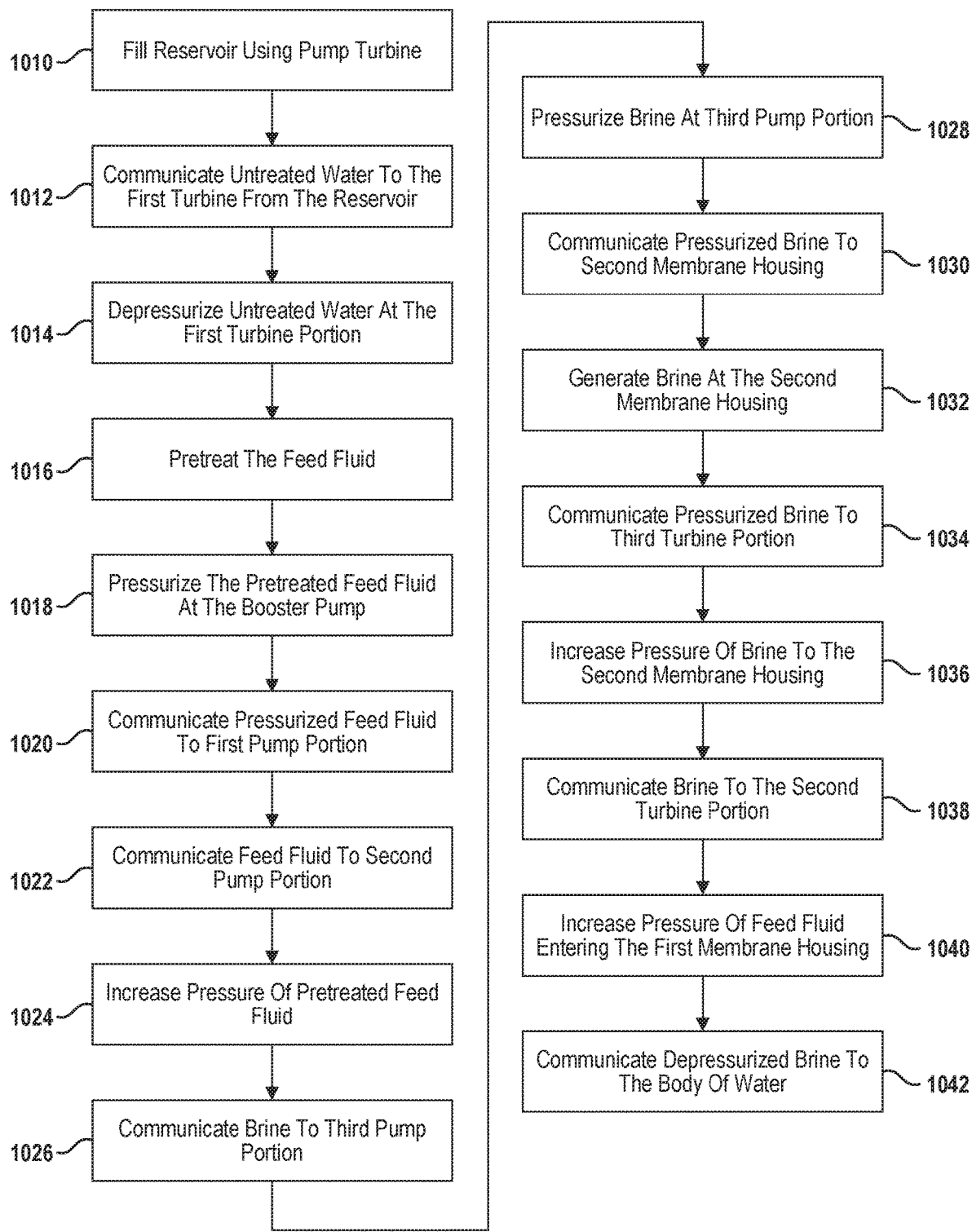
FIG. 10B is a flow chart of a method for operating the system of FIG. 10A.

Referring now to FIG. 10B, the reservoir is filled using the pump-turbine 68 in step 1010. In this example, a separate pipe is used from the penstock 70.

In step 1012, untreated water is communicated to the first turbine from the reservoir 62 to the penstock 70. Steps 1014-1022 correspond to steps 914-922 in which the feed fluid is depressurized at the first turbine portion 40B, pretreated, and ultimately pressurized at the booster pump 160, the first pump portion 40A, and the second pump portion 140A. The pressure of the pretreated feed fluid is increased at step 1024 prior to entering the feed fluid inlet 12A of the membrane housing 12.

The brine outlet 12B of the membrane housing 12 is in fluid communication with the third pump portion in step 1026. In step 1028, the third pump portion 170A pressurizes the feed prior to entering the feed fluid inlet 12A'. In step 1030, the brine fluid pressurized by the pump portion 170A is communicated to the feed fluid inlet 12A'.

In step 1032, brine fluid is generated at the second membrane housing 12'.

In step 1034, the pressurized brine fluid is communicated from the brine outlet 12B' to the third turbine portion 170B. The pressure from the brine fluid is used to increase the pressure of the brine fluid communicated from the first membrane housing 12 to the second membrane housing 12' in step 1036.

In step 1030, the brine fluid is communicated to the second turbine portion 140B. In step 1040, the pressure of the feed fluid to the first membrane housing 12 is increased using the excess pressure in the brine fluid by rotating the turbine portion 140B which in turn rotates the pump portion 140A of the second turbocharger 140. In step 1042, the depressurized brine fluid from the second turbine portion 140B is communicated to the fluid source 18.

Figure 11A:
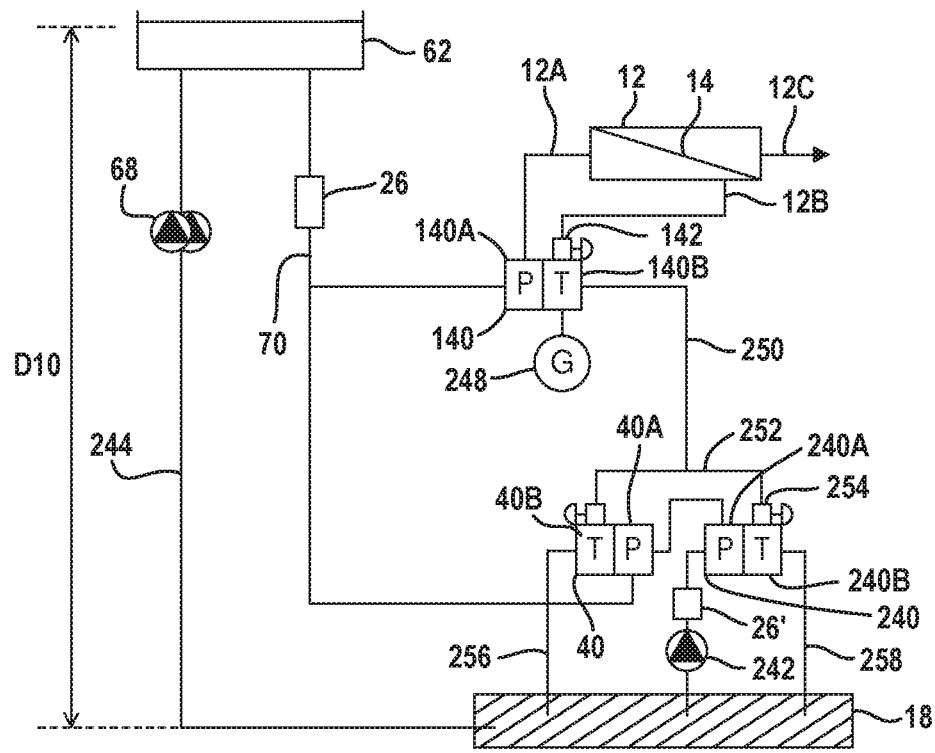
FIG. 11A is a schematic view of a seventh example of the present disclosure having three turbochargers.

Referring now to FIG. 11A, a configuration that is suitable for use when the elevation of the reservoir 62 is between about 300 and 350 meters. In this example, the first turbocharger 40 has a pump portion 40A fluidically coupled to both the pump portion 140A of the turbocharger 140 and the pretreatment system 26. The pump portion 40A is in fluid communication with a pump portion 240A of a third turbocharger 240. The pump portion 240A is in fluid communication with a pretreatment system 26' and a booster pump 242. Thus, fluid may be provided to the system in two paths. The pump-turbine 68 communicates fluid through the pipe 244 to the reservoir 62. In addition, to use the extra energy in an efficient manner, the booster pump 242 provides untreated water to the pretreatment system 26'. The pump portion 240A increases the pressure in the treated fluid from the pretreatment system 26'. The pump portion 240A receives fluid that has been pressurized at the pump portion 240A. The pump portion 240A communicates fluid that has been twice pressurized to either the pump portion 140A or the pretreatment system 26 and ultimately to the reservoir 62. Pretreated fluid enters the pump portion 140A where it is pressurized and communicated to the feed fluid inlet of the membrane housing 12. Permeate is produced at the membrane housing 12 and pressurized brine fluid is removed at the brine outlet 12B. The pressurized brine fluid is used at the turbine portion 140B to rotate the pump portion 140A to pressurize the feed fluid. Because the elevations are great, the turbine portion 140B may receive more energy in the brine fluid than is required for increasing the pressure in the feed fluid. A generator 248 is used to generate electricity at the turbine portion 140B.

The depressurized brine fluid from the turbine portion 140B is communicated to pipe 250 which in turn is in fluid communication with pipe 252. The pipe 252 is in communication with both the first turbine portion 40B and the second turbine portion 240B. The brine fluid is communicated to an integral brine flow adjustment valve 42, 254 respectively. Each turbine portion 40B, 240B rotates in response to the energy within the brine fluid and rotates the pump portion 40A, 240A using common shafts, respectively. Fluid from the turbine portions 40B, 240B is communicated through respective pipes 256, 258 to the fluid source 18. The brine fluid within the pipes 256, 258 has been depressurized.

Referring now to 11B, an alternate configuration for the turbocharger 40, 240 are set forth. In this example, the pipe 252 has been eliminated and thus the pipe 250 is in communication with the turbine portion 240B which communicates partially de-energized brine fluid from the turbine portion 240B to the pipe 260 which is in fluid communication with the turbine portion 40B. Thus, the turbine portions 240B and 40B are in series rather than parallel as in FIG. 11A. De-energized fluid from the turbine portion 40B is communicated through the pipe 256 to the fluid source 18. The pump portions 240A, 40A are also coupled in series in a manner similar to that illustrated above with respect to FIG. 11A. The configuration set forth in FIG. 11B is used when the brine pressure from the turbine portion 140B is high (such as above 30 bar) and there is a low flow rate.

Figure 11B:
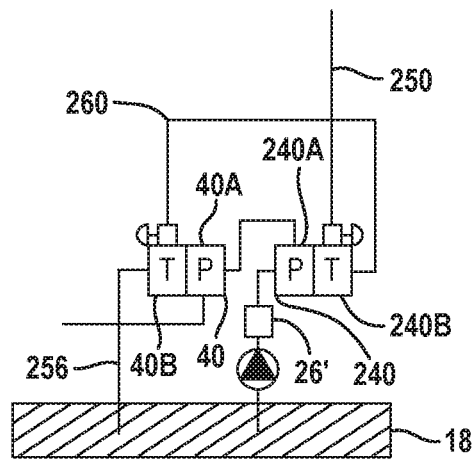
FIG. 11B is an alternate configuration for two of the turbochargers of FIG. 11A.
Figure 11C:
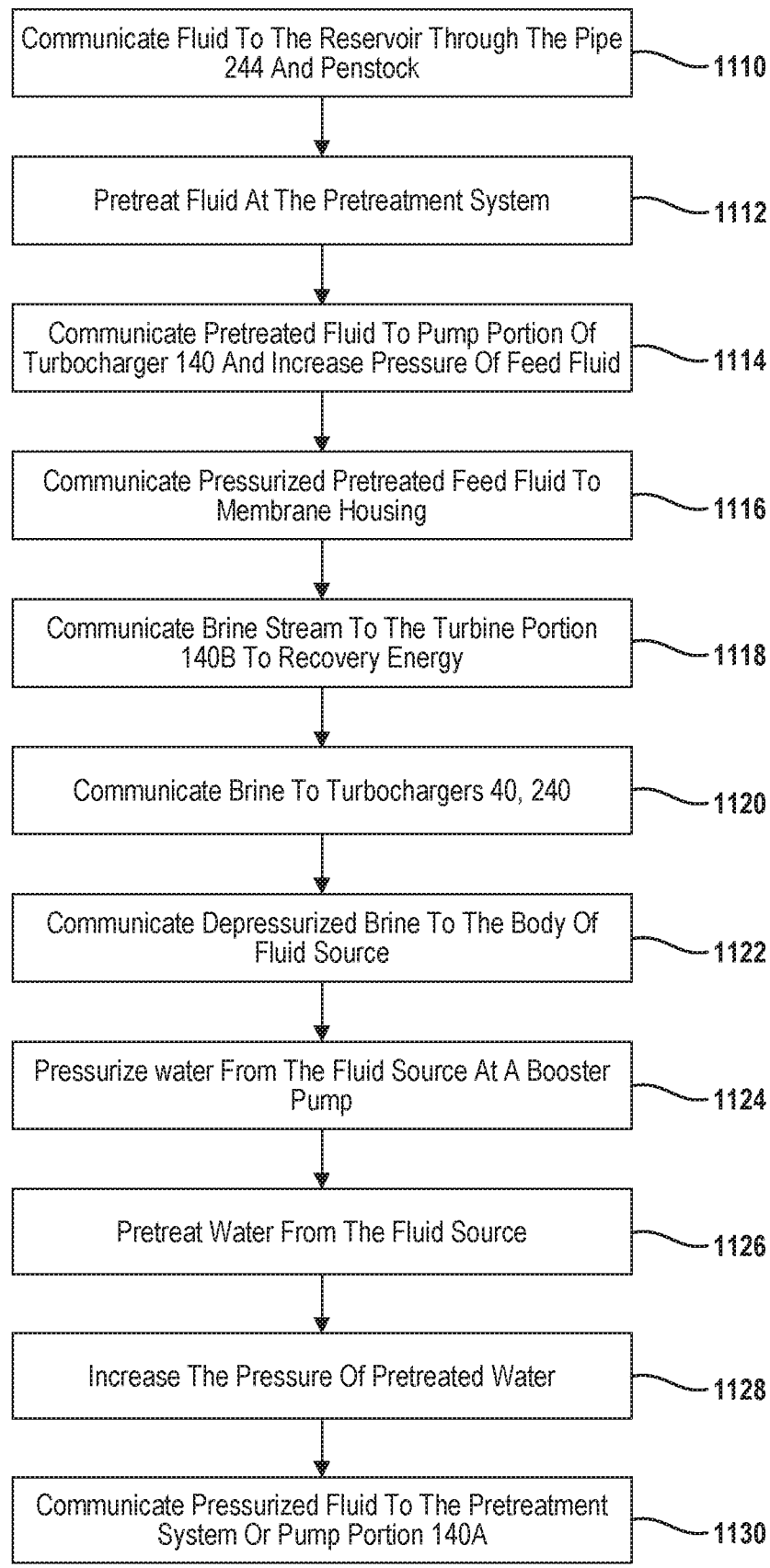
FIG. 11C is a flow of a method for operating the systems of FIGS. 11A and 11B.

Referring now to FIG. 11C, a method for operating the configurations set forth above in FIGS. 11A and 11B. In step 1110, fluid is communicated to the fluid from the reservoir 62 and is pretreated at the pretreatment system 26 in step 1112. In step 1114, pretreated fluid is communicated to the pump portion of the turbocharger 140 and the pressure of the feed fluid is increased at the pump portion 140A. The pressurized feed fluid is communicated to the membrane housing 12 where brine fluid and permeate are produced. The brine fluid is communicated from the brine outlet to the turbine portion 140B to recover some of the energy of the brine stream. In the present example, a generator 248 may generate electricity therefrom. Likewise, the energy in the brine stream is used to rotate the turbine which in turn rotates the pump portion 140A to pressurize the feed fluid in step 1118. In step 1120, partially pressurized brine fluid from the turbine portion 140B are communicated to the turbochargers 40, 240 where the pressurized brine fluid is used to pump the pump portions 40A, 240A. As mentioned above, the turbine portions may be in parallel as set forth in FIG. 11A or in series as set forth in FIG. 11B. In step 1122, the depressurized brine fluid is communicated to the fluid source 18.

Water from the fluid source 18 is pretreated in step 1126. The pretreated water has its pressure increased at the pump portions 40A, 240A. As mentioned above, the pressurized water is communicated to the pump portion 140A or the pretreatment system 26 or both. Fluid entering the pretreatment system 26 may be communicated to the reservoir 62. Fluid entering the pump portion 140A is further pressurized by the turbine portion 140B in step 1130

Figure 12A:
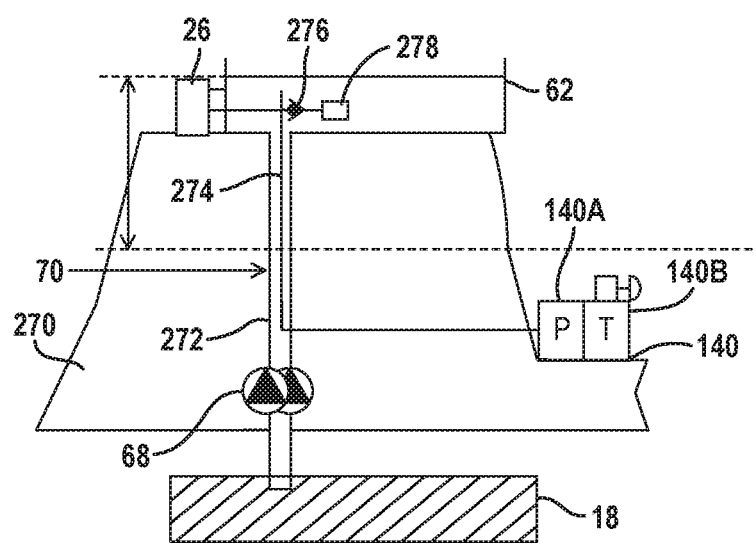
FIG. 12A is a schematic view of a tunnel system used for housing the penstock and the piping connecting to a turbocharger.

Referring now to FIG. 12, a land mass 270 is illustrated. The land mass 270 has a tunnel 272 drilled therein. The tunnel 272 may act as a penstock. The pump-turbine 68 communicates fluid through the penstock 70 which is formed from the tunnel 272. In this example, the pretreatment system 26 is located adjacent to the reservoir 62. Pretreated water may be communicated through a pipe 274 that is disposed within the tunnel 272. The pipe 274 connects the pretreatment system 26 to the pump portion 140A of the turbocharger 140. A check valve 276 may be coupled to the pipe 274 and is disposed within the reservoir 62. The check valve 276 prevents the pipe from dropping lower than the pressure within the penstock 70 and thus the tunnel 272. The pipe 274 may be formed of a light weight material and thus if a high differential of pressure exists, the pipe may be compromised. That is, a thin wall and light weight construction, such as non-metallic materials, may be used for the pipe 274. Thus, the check valve 276 prevents the pressure within the pipe from dropping below that of the penstock 70. The check valve 276 allows water from the reservoir 62 to enter the pipe 274. A pressure sensor 278 disposed on the check valve 276 may provide a warning signal if it opens to allow operators to make necessary adjustments to restore normal operation to the system.

By monitoring the pressure at the pressure sensor 278, the pressure within the pipe 274 may be monitored to be about 0.5 to 1.0 bar higher than the water in the penstock 70 to keep the pipe stiffened with internal pressure.

Figure 12B:
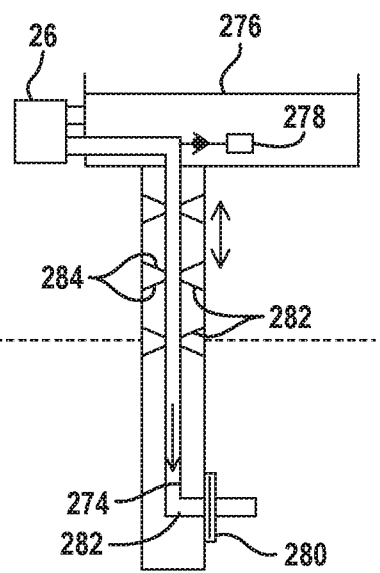
FIG. 12B is a detailed side view of the tunnel and the reservoir with the pipe therein.

Referring now to FIG. 12B, the pipe 274 may be coupled to the tunnel 272 with a flange 280. An elbow 282 provides an angle within the tunnel 272 so that the end of the pipe 274 extends from the flange 280. A plurality of struts 284 disposed within the tunnel 272 may attach the pipe 274 within the tunnel 272. It should also be noted that the density of the untreated water and the pretreated water is the same and thus there is not build-up of pressure difference due to the difference in the fluid density.

Figure 13:
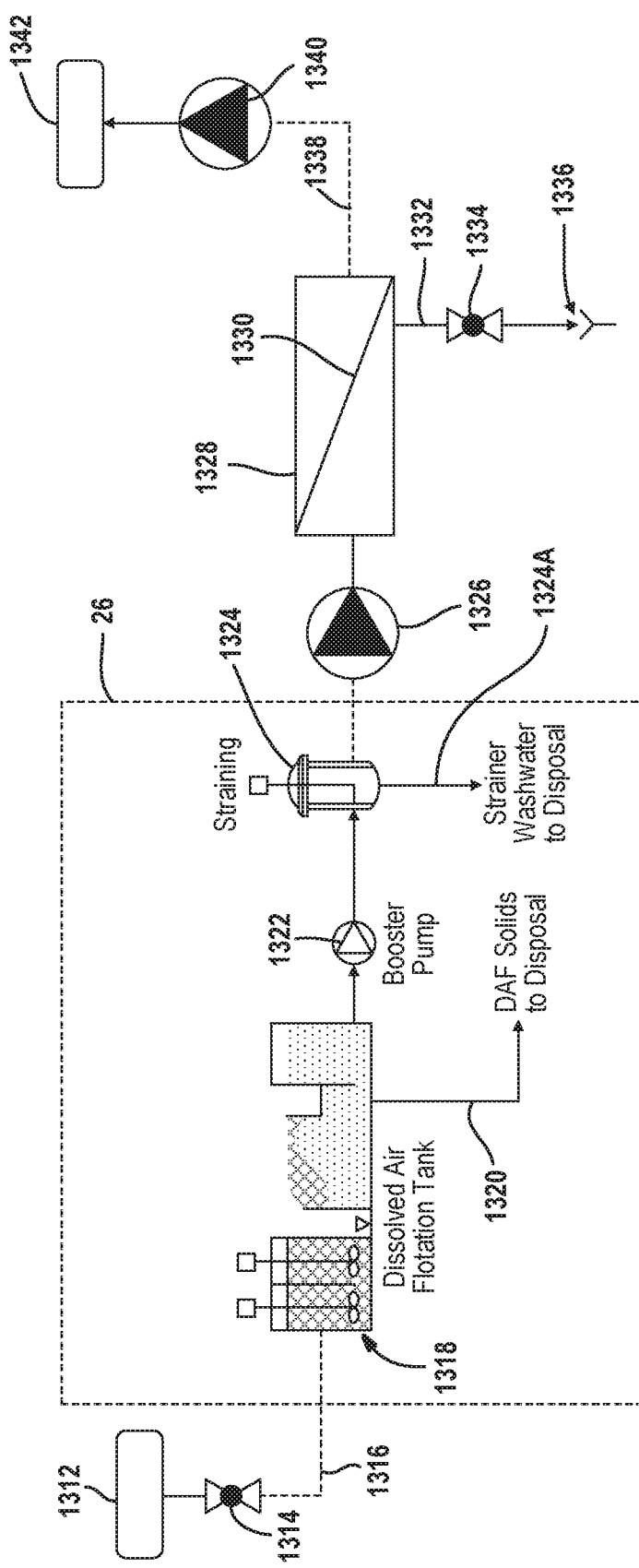
FIG. 13 is a block diagrammatic view of a prior art filtration system.

Referring now to FIG. 13, a system according to the prior art set forth. In this example a fluid source 1312 provides fluid to a valve 1314 which in turn provides low pressure fluid to the pretreatment system 26. Details of the pretreatment system 26 is illustrated in further detail. Filtration of fluids is used to remove suspended solids or dissolve materials. The pretreatment system 26 is illustrated as having a dissolved air flotation tank 1318. However, other types of filtration systems may be used such as sand filters and cartridge filters. Filtration systems in the prior art are typically designed for operating under relatively low pressure rating such as 10 bar. Some filtration devices are available for up to 15 bar. In some industries such as all of the oil and gas industry, high fluid stream pressures are available but filtration without substantial reduction in pressure must be used. Such filtration equipment is cost prohibitive in many applications.

The dissolved air flotation tank 1318 has an outlet 1320 for removing the solids for disposal. The dissolved air flotation tank 1318 has a booster pump 1322 that is used to overcome the flow resistance through a filter 1324. A drain 1324A of the filter 1324 removes undesired solids for disposal. Once the filtered fluid leaves the pretreatment system 26, a high-pressure pump 1326 provides high pressure fluid to a process such as to a reverse osmosis system membrane housing 1328 that has a reverse osmosis system membrane 1330 therein. High pressure brine fluid is removed from the housing 1328 through a pipe 1332. A valve 1334 controls the amount of brine fluid that is provided to a drain 1336. Permeate flows from the housing 1328 through the permeate outlets 1338. The permeate is at low pressure. The low-pressure permeate is communicated to a high pressure pump 1340 for further processing by a process 1342. The pump 1326 is heavy and requires a very large motor and power supply for a typical system such as a reverse osmosis system.

Figure 14:
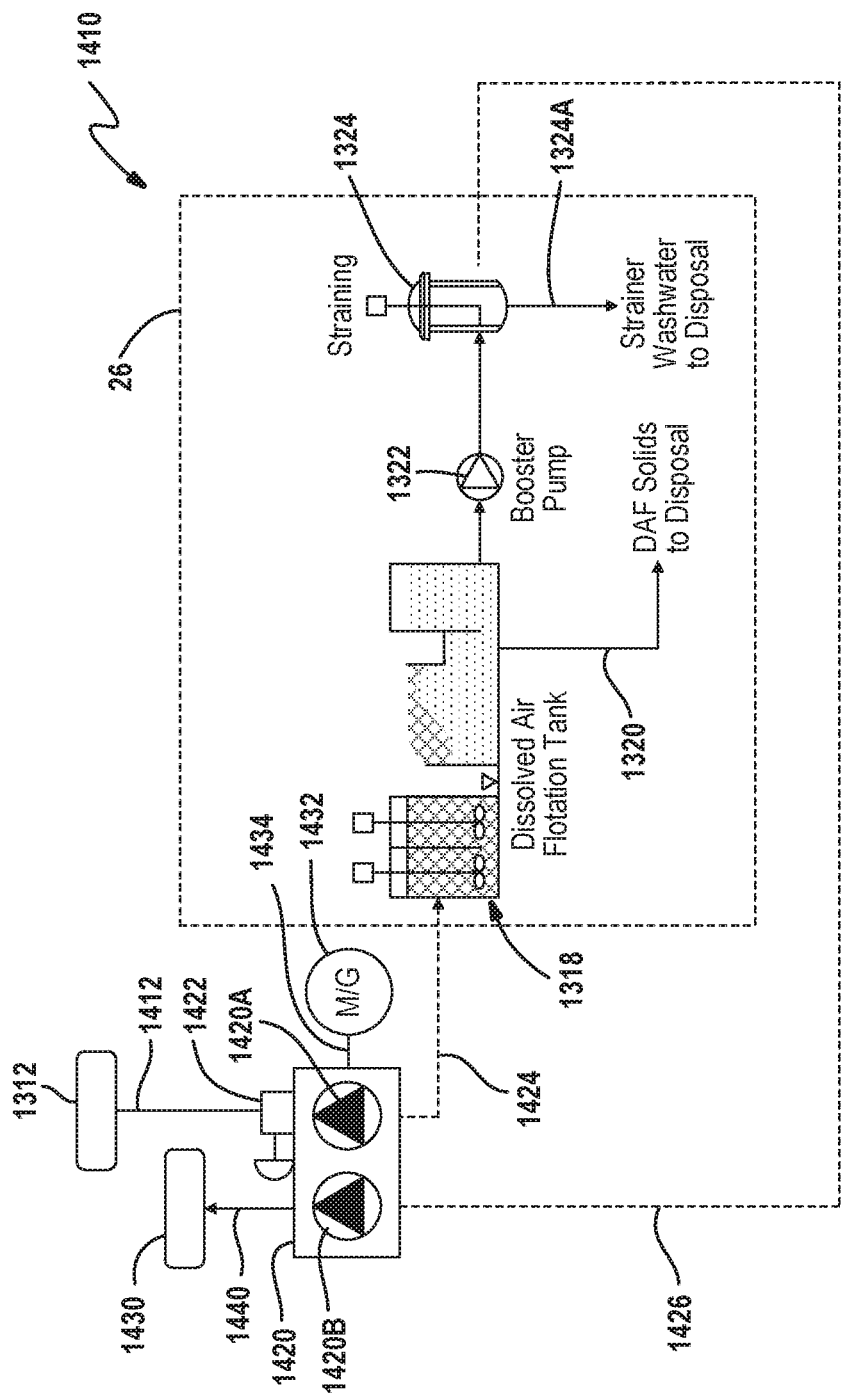
FIG. 14 is a schematic view of a pretreatment system according to the present disclosure.

Referring now to FIG. 14, and improved filtration system 1410 is set forth. The pretreatment system 26 is configured in a similar manner to that set forth above in FIG. 13 and thus will not be described in detail. In this example, the high pressure fluid is communicated from the source 1312 through a pipe 1412. The high-pressure fluid is communicated to a turbocharger 1420. In particular, the high-pressure fluid is communicated to an auxiliary nozzle 1422 to a turbine portion 1420A of the turbocharger 1420. The turbine portion 1420A depressurizes the high-pressure fluid prior to entering the pretreatment system 26 through the pipe 1424. The depressurized fluid from the fluid source 1312 is filtered and communicated through a low pressure pipe 1426 to the pump portion 1420B of the turbocharger 1420. The pump portion 1420B pressurizes the low-pressure filtered fluid from the pretreatment system 26. A motor (motor/generator) 1432 having a shaft 1434 which is common to both the turbine portion 1420A and 1420B may be used to rotate the pump portion 1420B to increase the pressure as needed to a desired pressure. The pressurized fluid leaves the pump portion 1420B and is communicated to the process 1430 through a pipe 1440. When the process 1430 requires a higher pressure than that which the pump portion 1420B can provide, the motor 1432 rotates to increase the pressure provided by the pump portion 1420B. When excess power is provided by the pump portion 1420B, the motor 1432 acts as a generator to generate electrical energy for other equipment. That is, when the turbine portion 1420A rotates, the generator can absorb some of the excess electrical power so that that the pump is providing a lower amount of pressure as required by the system.

Figure 15:
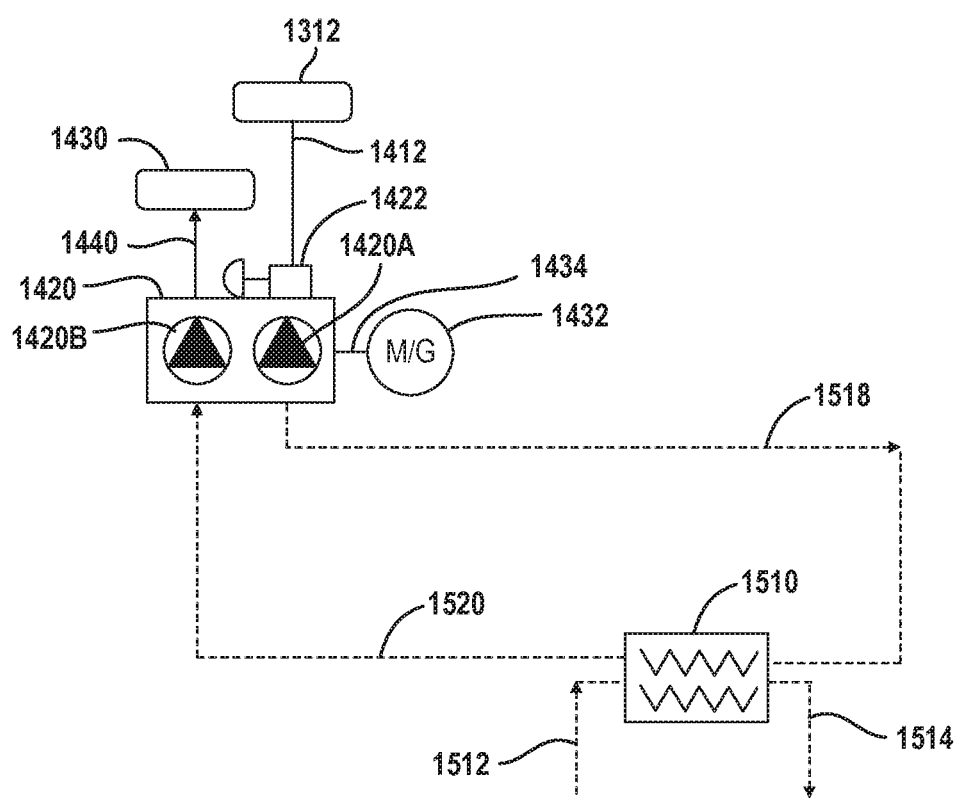
FIG. 15 is a schematic representation of a pressurization system used for a heat exchanger.

Referring now to FIG. 15, the energy recovery system may also be used with a heat exchanger 1510. The heat exchanger 1510 has a plurality of thin metal passages to achieve the highest possible heat transfer for either heating or cooling a fluid. In this example for cooling, a pipe 1518 provides heated fluid to the heat exchanger 1510 with the excess heat removed from the fluid supplied by the pipe 1518. Cooling fluid is provided to the heat exchanger 1510 through the inlet pipe 1512. The outlet pipe 1514 communicates the cooling fluid away from the heat exchanger 1510. The temperature of the fluid at the pipe 1514 is increased due to the heat exchanging process. The low-pressure fluid is then communicated through the outlet pipe 1520 to the pump portion 1420B of the turbocharger 1420.

In operation, the high-pressure fluid from the source 1312 is communicated through the auxiliary nozzle 1422 and is depressurized at the turbine portion 1420A. The depressurized fluid is provided through the pipe 1518 and through the heat exchanger 1510. Fluid from the heat exchanger is communicated to the pump portion 1420B. The heat exchanger 1510 may be used for heating or cooling the fluid from the source 1312. The pressure of the depressurized fluid is increased at the pump portion 1420B to be used in a process 1430.

Figure 16:
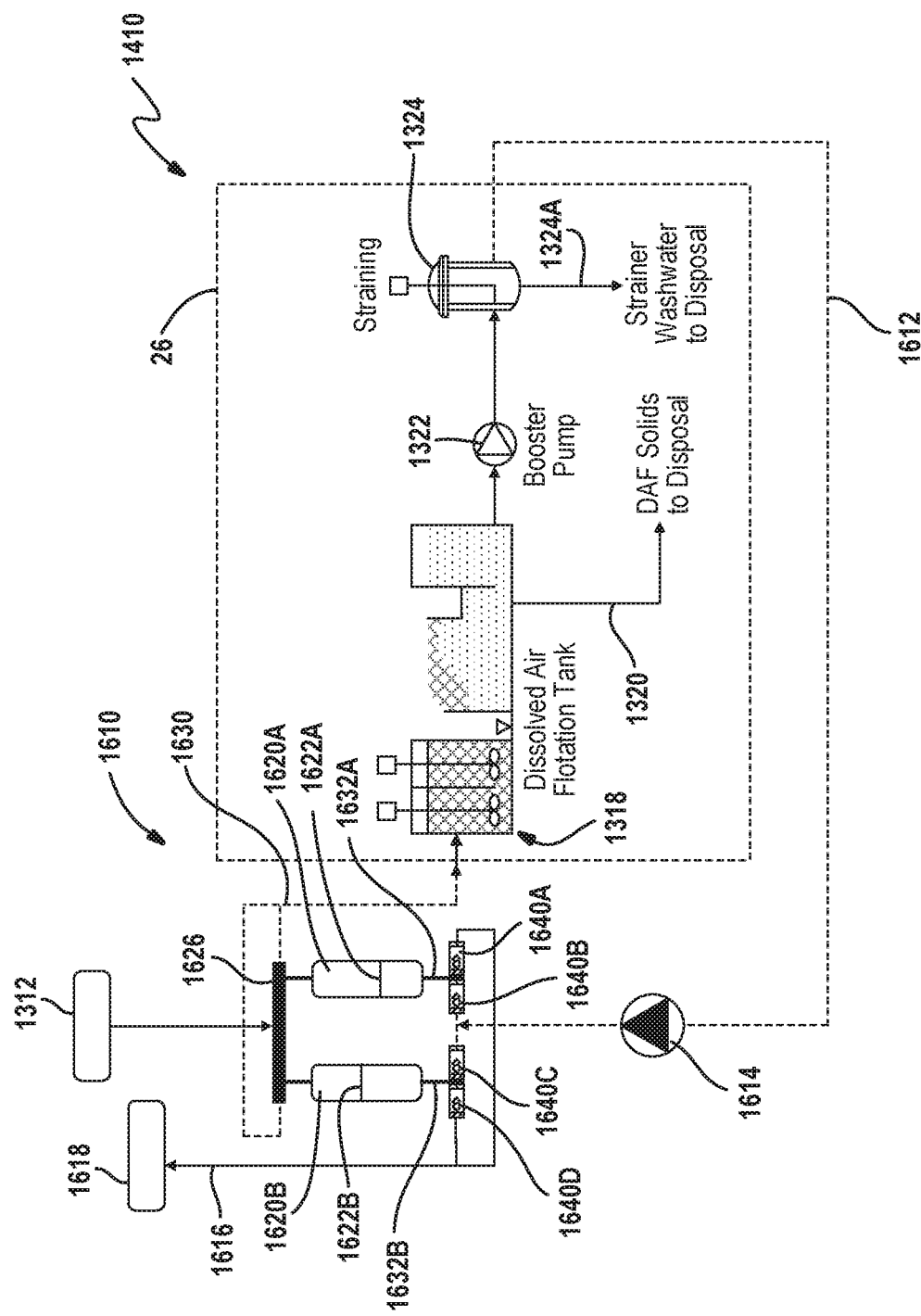
FIG. 16 is a schematic view of a filtration system using a pump system.

Referring now to FIG. 16, one example of a pump for use in providing depressurized fluid to the pretreatment system 26 is illustrated. In this example the turbocharger of the previous figures has been replaced by a direct acting pump 1610. The direct acting pump 1610 receives unfiltered high-pressure fluid for depressurization and eventual communication to the pretreatment system 26. The direct acting pump 1610 re-pressurizes the filtered fluid in the pipe 1612 with a pump 1614 and the direct acting pump 1610. The re-pressurized fluid is provided to the process chamber 1618.

Many types of direct acting pumps may be used. In this example, the direct acting pump 1610 includes a first chamber 1620A and a second chamber 1620B. A partition 1622A is located in the first chamber 1620A to separate the first chamber into two volumes; an upper volume and lower volume. A second partition 1622B is located in the second chamber 1620B to separate the second chamber 1620B into an upper volume or lower volume. The partitions 1622A, 1622B move freely to prevent the unfiltered fluid from mixing with the filtered fluid.

Unfiltered fluid is provided to the chamber 1620A, 1620B through a four way valve 1626 from the fluid source 1312. The four way valve 1626 alternately transmits high pressure unfiltered process fluid to one chamber while allowing low-pressure fluid to drain from the other chamber. The four way valve 1626 is coupled to the pretreatment system 26 through the pipes 1630. The upper volumes of the chambers 1620A and 1620B receive the untreated fluid. Filtered fluid is received and the bottom portions of the chamber 1620A and 1620B through ports 1632A and 1632B.

The pump 1614 and the lower portion of the chamber 1620A, 1620B are coupled to the process chamber 1618 through pipe 1616. As was mentioned above, the chambers 1620A, 1620B alternate in providing low-pressure fluid to the pretreatment system 26. Likewise, high-pressure fluid that has been filtered by the pretreatment system 26 is provided to the process chamber 1618 from the direct acting pump 1610. A plurality of check valves 1640A-1640D allow fluid to be communicated from the pump 1614 to the lower portion of chambers 1620A, 1620B or from the chambers 1620A, 1620B to the process chamber 1618. The pump 1614 raises the filtered fluid pressure sufficiently high to force unfiltered fluid through the pretreatment system. In a typical situation it is believed that between four and five bars of pressure may be provided by the pump 1614 to increase the pressure of the filtered fluid beyond the capability of the direct acting pump 1610.

In operation, as one chamber is filling with untreated fluid the other chamber is exhausting low-pressure fluid to the pretreatment system 26. Likewise, when one chamber is filling with filtered fluid the other is exhausting the filtered fluid to the process chamber 1618.

Figure 17:
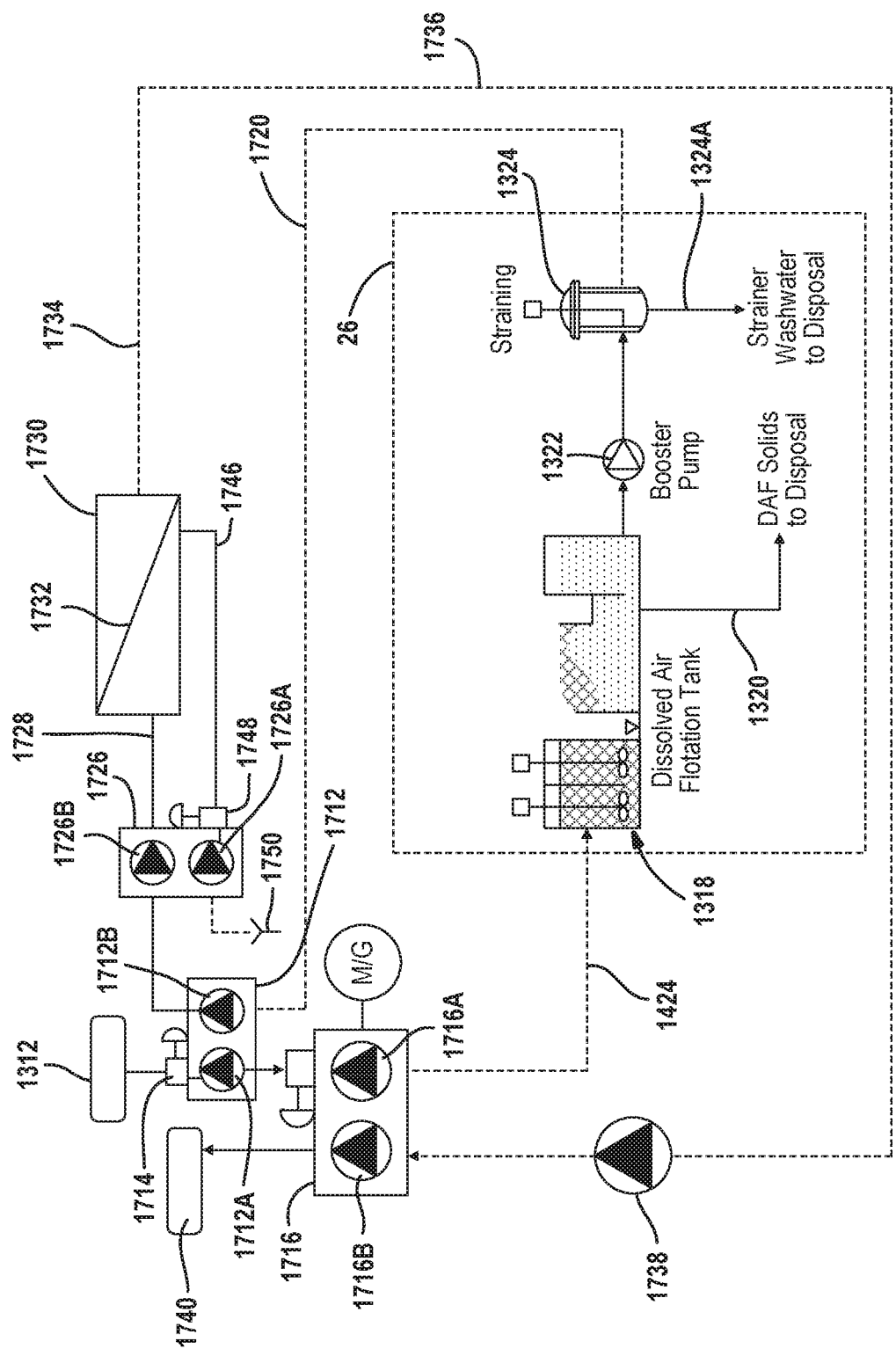
FIG. 17 is a schematic view of a pre-treatment system having a dual stage depressurization prior to filtration.

Referring now to FIG. 17, the pretreatment system 26 is illustrated with the same components illustrated above and will not be described in more detail. In this example, the fluid source 1312 communicates high-pressure unfiltered fluid to a first turbocharger 1712 and in particular to a turbine portion 1712A of the first turbocharger 1712 through an auxiliary nozzle 1714. The first turbocharger 1712 (turbine portion 1712A) partially depressurizes the pressurized fluid from the fluid source 1312. The partially depressurized fluid is communicated to a second turbocharger 1716 and, in particular, to a second turbine portion 1716A. The turbocharger 1716 depressurizes the feed fluid for a second time for communication into the pretreatment system 26.

The outlet pipe 1720 of the pretreatment system 26 is used to communicate filtered (pretreated) fluid to the pump portion 1712B of the first turbocharger 1712. The pump portion 1712B pressurizes the filtered fluid and communicates the filtered and pressurized fluid to the third turbocharger 1726. In particular, the pretreated partially pressurized filtered fluid is communicated to a pump portion 1726B of the turbocharger 1726. The pump portion 1726B further pressurizes the fluid from the second pump portion 1712A. The pressurized and filtered feed fluid is communicated to the reverse osmosis housing 1730. A portion of the pressurized feed fluid passes through the membrane 1732 and leaves the housing 1730 through a permeate outlet 1734. The permeate which is under low pressure is communicated through the pipe 1736 to the pump 1738. The pump pressurizes the permeate to the pump portion 1716B where it is communicated to a process 1740 under high pressure. The pressure of the low pressure permeate is increased at the pump 1738 and pump portion 1716B.

In the reverse osmosis system housing 1730, a brine outlet 1746 communicates high-pressure brine fluid through an auxiliary valve 1748 to the turbine portion 1726A of the third turbocharger 1726. The pressure from the brine fluid is used to increase the pressure of the fluid from the second pump portion 1712A. That is, the energy from the brine fluid at the turbine portion 1726A is converted into pressurizing the inlet to the reverse osmosis system housing 1730. Fluid passing through the turbine portion 1726A is communicated to the drain 1750. The fluid to the drain 1750 is depressurized. It should be noted that the turbocharger 1716 and the pump portion 1716B provide the filtered fluid with the bulk of the pressure while being supplemented by the pump 1738.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A reverse osmosis system coupled to a reservoir and a fluid source below the reservoir, said system comprising:
    a first pretreatment system;
    a first membrane housing comprising a reverse osmosis membrane therein, said membrane housing comprising a feed fluid inlet, a brine outlet and a permeate outlet;
    a first turbocharger comprising a first pump portion and a first turbine portion, the first pump portion receiving feed fluid from the first pretreatment system, pressurizing the feed fluid and communicating the feed fluid to the feed fluid inlet, the first turbine portion receiving brine fluid from the brine outlet;
    a second turbocharger comprising a second pump portion and a second turbine portion;
    a third turbocharger comprising a third pump portion and a third turbine portion,
    said second turbine portion and the third turbine portion receiving brine fluid from the first turbine portion;
    a second pretreatment system; and
    a booster pump in series with the second pretreatment system, said second pretreatment system communicating second feed fluid to the second pump portion to increase a pressure of the second feed fluid;
    said second pump portion communicating second feed fluid to the third pump portion to increase the pressure of the second feed fluid, said third pump portion communicating the second feed fluid to the first pump portion.

2. The system of claim 1 further comprising a generator coupled to the first turbine portion.

3. The system of claim 1 wherein the second turbine portion and the third turbine portion fluidically communicate depressurized brine fluid to the fluid source.

4. The system of claim 1 wherein the second turbine portion communicates brine fluid to the third turbine portion.

5. The system of claim 4 wherein said third turbine portion communicates brine fluid to the fluid source.

6. The system of claim 1 further comprising a pump-turbine fluidically coupling the fluid source to the reservoir.

7. The system of claim 1 wherein the further comprising a tunnel disposed in land supporting the reservoir, said tunnel communicating untreated feed fluid to the reservoir, said tunnel comprising a first pipe disposed therein said first pipe communicating pretreated fluid to the first pump portion.

8. The system of claim 7 wherein struts hold the first pipe within the tunnel.

9. The system of claim 8 further comprising a flange covering a portion of the tunnel, said first pipe coupled to the flange.

10. A method of operating a reverse osmosis system coupled to a reservoir a fluid source located below the reservoir, the system comprises a first pretreatment system, a first membrane housing comprising a first reverse osmosis membrane therein, the first membrane housing comprising a first feed fluid inlet, a first brine outlet and a first permeate outlet, a first turbocharger comprising a first pump portion and a first turbine portion, a second turbocharger comprising a second pump portion and a second turbine portion, a third turbocharger comprising a third pump portion and a third turbine portion, a second pretreatment system and a booster pump, said method comprising:
    communicating fluid to a fluid reservoir from the fluid source through a pump-turbine;
    communicating the fluid through the first pretreatment system to form feed fluid;
    pressurizing the feed fluid at the first pump portion;
    communicating the feed fluid to the first feed fluid inlet from the first pump portion;

communicating brine fluid from the first brine outlet of first membrane housing to the first turbine portion to operate the first pump portion;

communicating brine from the first turbine portion to the second turbine portion to operate the second pump portion and the third turbine portion to operate the third pump portion;

communicating second feed fluid from the fluid source through the second pretreatment system to the second pump portion;

increasing a pressure of the second feed fluid at the second pump portion;

thereafter, communicating the second feed fluid to the third pump portion to increase the pressure of the second feed fluid; and communicating the second feed fluid from the third pump portion to the first pump portion.

11. The method of claim 10 wherein communicating brine fluid from the first turbine portion to the second turbine portion to operate the second pump portion and the third turbine portion to operate the third pump portion comprises communicating brine fluid from the first turbine portion first to the second turbine portion to operate the second pump portion and thereafter to the third turbine portion to operate the third pump portion.

12. The method of claim 10 wherein communicating brine fluid from the first turbine portion to the second turbine portion to operate the second pump portion and the third turbine portion to operate the third pump portion comprises communicating brine fluid from the first turbine portion to the second turbine portion to operate the second pump portion and to the third turbine portion to operate the third pump portion in parallel.

13. The method of claim 10 further comprising coupling a generator to the first turbine portion.

14. The method of claim 10 wherein the second turbine portion and the third turbine portion fluidically communicate depressurized brine fluid to the fluid source.

15. The method of claim 10 wherein the further communicating untreated feed fluid to the reservoir in a tunnel, said tunnel comprising a first pipe disposed therein, communicating pretreated fluid to the first pump portion through the first pipe.

16. The method of claim 15 further comprising holding the first pipe within the first tunnel with struts.

17. The method of claim 15 further comprising covering a portion of the tunnel with a flange, and coupling the first pipe to the flange.

* * * * *